(12) United States Patent
Huang et al.

(10) Patent No.: US 11,012,999 B2
(45) Date of Patent: *May 18, 2021

(54) METHOD AND APPARATUS FOR INDICATING TIME DOMAIN RESOURCE ALLOCATION OF DATA TRANSMISSION IN A WIRELESS COMMUNICATION SYSTEM

(71) Applicant: ASUSTek Computer Inc., Taipei (TW)

(72) Inventors: Chun-Wei Huang, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/879,552

(22) Filed: May 20, 2020

(65) Prior Publication Data
US 2020/0280983 A1    Sep. 3, 2020

Related U.S. Application Data

(63) Continuation of application No. 16/184,239, filed on Nov. 8, 2018, now Pat. No. 10,708,912.

(60) Provisional application No. 62/585,194, filed on Nov. 13, 2017.

(51) Int. Cl.
*H04W 72/04* (2009.01)
*H04W 72/12* (2009.01)
*H04L 5/00* (2006.01)

(52) U.S. Cl.
CPC ....... *H04W 72/0446* (2013.01); *H04L 5/0007* (2013.01); *H04L 5/0053* (2013.01); *H04L 5/0094* (2013.01); *H04W 72/1289* (2013.01)

(58) Field of Classification Search
CPC .................................. H04W 72/0446
USPC ........................................ 370/336
See application file for complete search history.

(56) References Cited

U.S. PATENT DOCUMENTS 10,708,912 B2 *  7/2020  Huang .............. H04W 72/0446

* cited by examiner

*Primary Examiner* — Peter G Solinsky
(74) *Attorney, Agent, or Firm* — Skaar Ulbrich Macari, P.A.

(57) ABSTRACT

A method and apparatus are disclosed from the perspective of a UE (User Equipment). In one embodiment, the method includes the UE being configured with a control resource set (CORESET). The method further includes the UE receiving a Downlink Control Information (DCI) on the CORESET, wherein an index is included in the DCI and the index indicates a time domain resource allocation pattern. The method also includes the UE receiving data in Orthogonal Frequency Division Multiplexing (OFDM) symbols determined according to the time domain resource allocation pattern, wherein a range of the time domain resource allocation pattern starts from the first OFDM symbol of the CORESET or after an offset from the first OFDM symbol of the CORESET, and the range of the time domain resource allocation pattern may end across a slot boundary.

12 Claims, 17 Drawing Sheets

| $\mu$ | $\Delta f = 2^{\mu} \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

FIG. 5 (PRIOR ART)

| System BW ($N_{RB}^{DL}$) | $N_{RB}^{step}$ |
|---|---|
| | DCI format 1C |
| 6-49 | 2 |
| 50-110 | 4 |

FIG. 6 (PRIOR ART)

METHOD AND APPARATUS FOR INDICATING TIME DOMAIN RESOURCE ALLOCATION OF DATA TRANSMISSION IN A WIRELESS COMMUNICATION SYSTEM

CROSS-REFERENCE TO RELATED APPLICATIONS

This application is a Continuation of U.S. patent application Ser. No. 16/184,239, filed Nov. 8, 2018, which claims the benefit of U.S. Provisional Patent Application Ser. No. 62/585,194 filed on Nov. 13, 2017, the entire disclosures of which are incorporated herein in their entirety by reference.

FIELD

This disclosure generally relates to wireless communication networks, and more particularly, to a method and apparatus for indicating time domain resource allocation of data transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes the UE being configured with a control resource set (CORESET). The method further includes the UE receiving a Downlink Control Information (DCI) on the CORESET, wherein an index is included in the DCI and the index indicates a time domain resource allocation pattern. The method also includes the UE receiving data in Orthogonal Frequency Division Multiplexing (OFDM) symbols determined according to the time domain resource allocation pattern, wherein a range of the time domain resource allocation pattern starts from the first OFDM symbol of the CORESET or after an offset from the first OFDM symbol of the CORESET, and the range of the time domain resource allocation pattern may end across a slot boundary.

BRIEF DESCRIPTION OF THE DRAWINGS

FIG. 5 is a reproduction of Table 4.1-1 of 3GPP TS 38.211 V0.1.0.

FIG. 6 is a reproduction of Table 7.1.6.3-1 of 3GPP TS 36.213 V8.8.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TSG RAN WG1 AH Meeting #1701 RAN1 Chairman's Notes; TSG RAN WG1 Meeting #87 RAN1 Chairman's Notes; TSG RAN WG1 Meeting #88bis RAN1 Chairman's Notes; TSG RAN WG1 AH Meeting #1706 RAN1 Chairman's Notes; TSG RAN WG1 Meeting #90 RAN1 Chairman's Notes; TSG RAN WG1 AH Meeting #1709 RAN1 Chairman's Notes; TSG RAN WG1 Meeting #90bis RAN1 Chairman's Notes; TR 38.802 v14.1.0, "Study on New Radio, Access Technology, Physical Layer Aspects"; R1-1717151, "Introduction of shortened processing time and shortened TTI into 36.212", Huawei; 3GPP TS 38.211 V0.1.0, "NR; Physical channels and modulation (Release 15)"; and TS 36.213 v8.8.0, "Evolved Universal Terrestrial Radio Access (E-UTRA); Physical layer procedures (Release 8)". The standards and documents listed above are hereby expressly incorporated by reference in their entirety.

Figure 1:
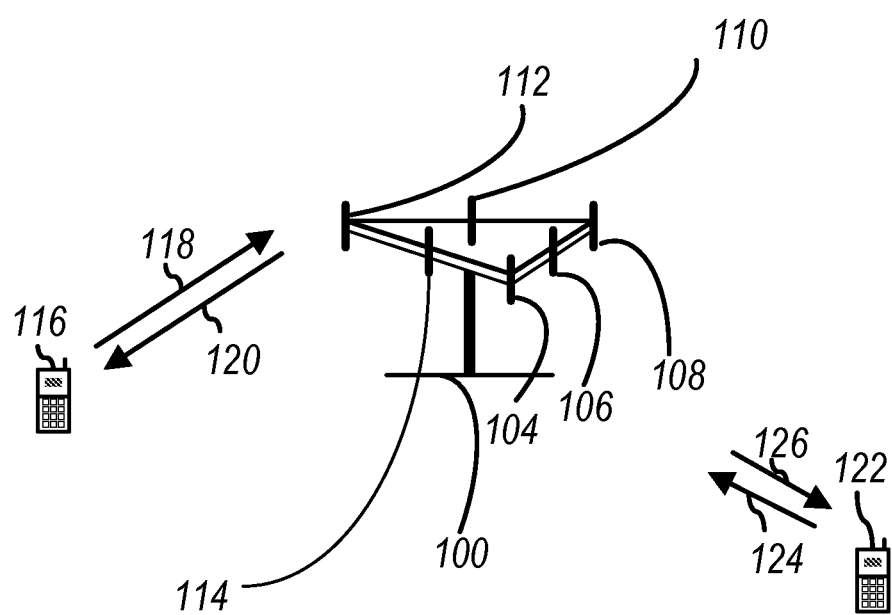
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
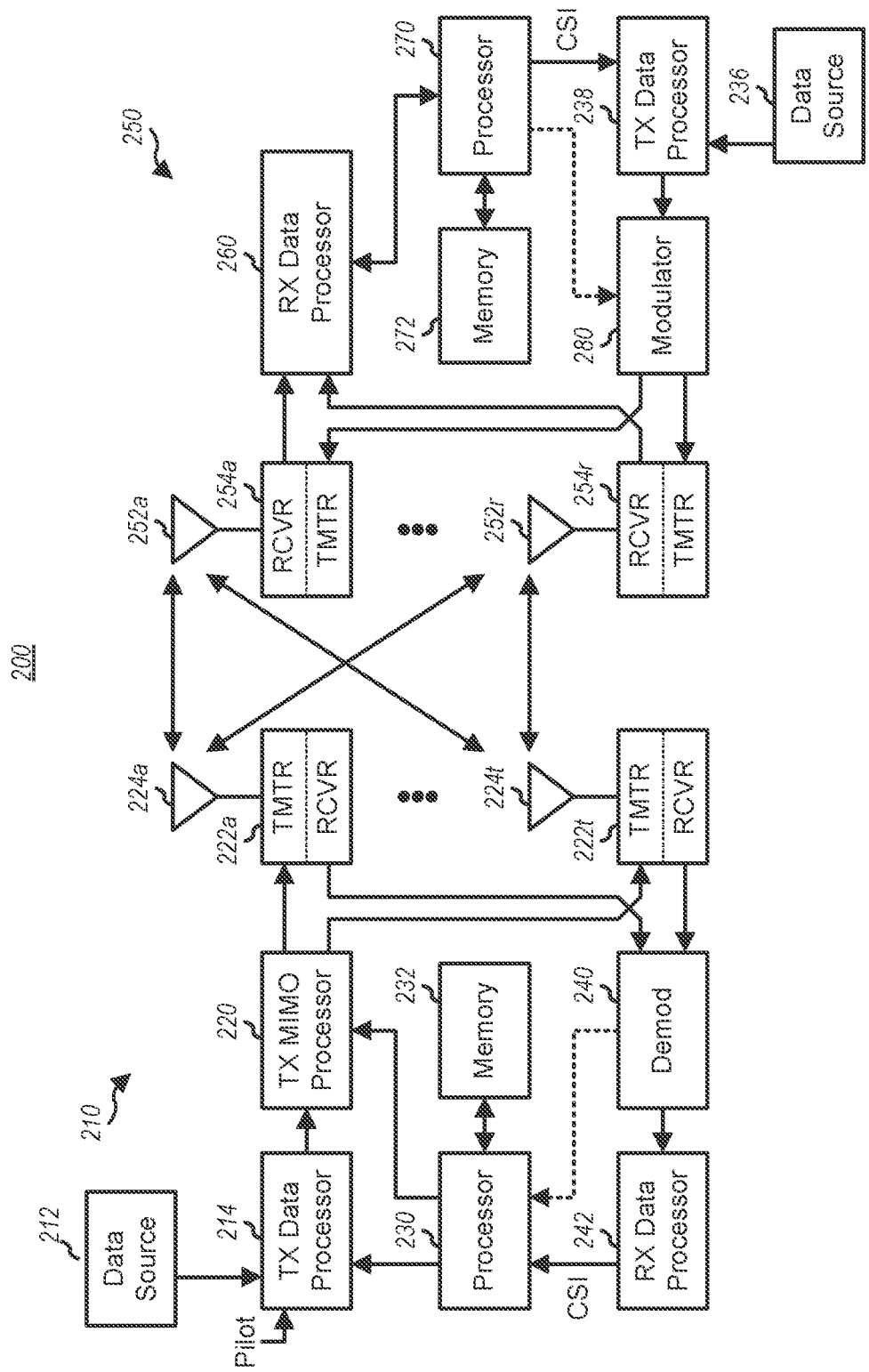
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
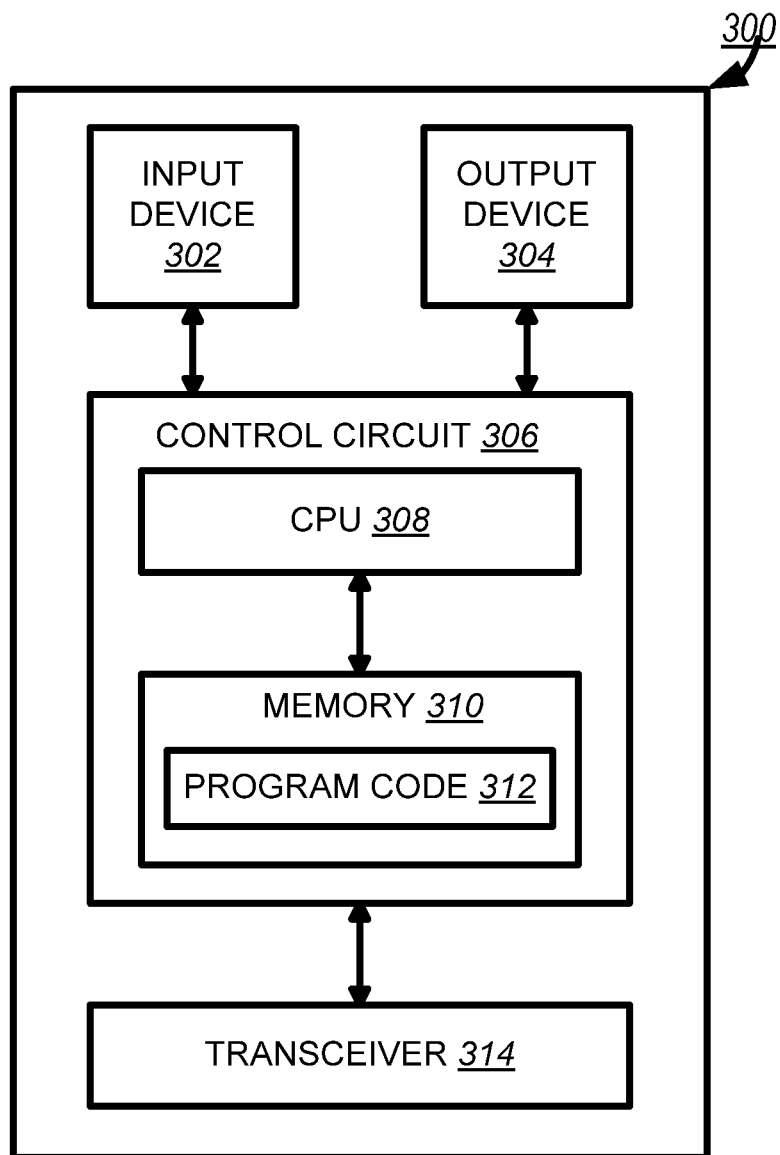
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
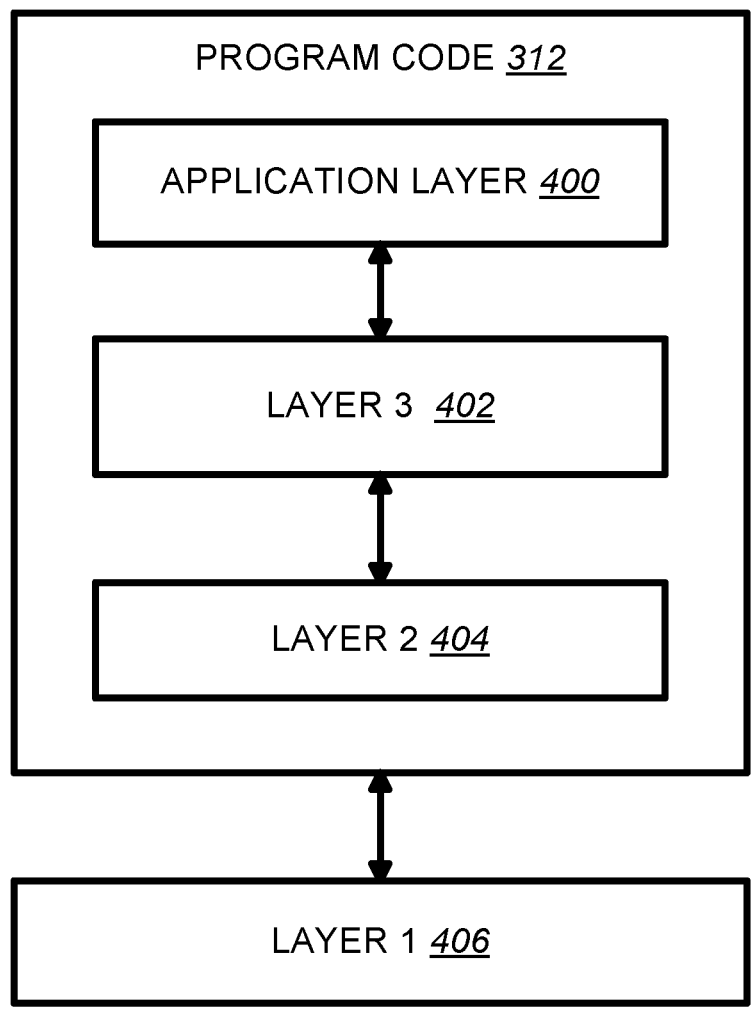
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As discussed in the 3GPP TS RAN WG1 AH Meeting #1701 RAN1 Chairman's Notes, timing between DL assignment and corresponding DL data can be dynamically indicated by a DCI as follows:

Agreements:
  Timing between DL assignment and corresponding DL data transmission is indicated by a field in the DCI from a set of values
  The set of values is configured by higher layer As discussed in the 3GPP TS RAN WG1 Meeting #87 RAN1 Chairman's Notes, mini-slot definition is defined below. The first agreement describes about properties of mini-slot, such as flexible length from 1 to slot length-1, or starting at any OFDM (Orthogonal Frequency Division Multiplexing) symbol.

87
Agreements:
  Mini-slots have the following lengths
    At least above 6 GHz, mini-slot with length 1 symbol supported
      FFS below 6 GHz including unlicensed band
      FFS for URLLC use case regardless frequency band
      FFS whether DL control can be supported within one mini-slot of length 1
    Lengths from 2 to slot length −1
      FFS on restrictions of mini-slot length based on restrictions on starting position
      For URLLC, 2 is supported, FFS other values
    Note: Some UEs targeting certain use cases may not support all mini-slot lengths and all starting positions
  Can start at any OFDM symbol, at least above 6 GHz
    FFS below 6 GHz including unlicensed band
    FFS for URLLC use case regardless frequency band
  A mini-slot contains DMRS at position(s) relative to the start of the mini-slot Agreements:
  NR-PDCCH monitoring at least for single-stage DCI design,
    NR supports the following minimum granularity of the DCI monitoring occasion:
      For slots: once per slot
      When mini-slots are used: FFS if every symbol or every second symbol
        FFS with respect to which numerology if slot and mini-slot have different numerology (e.g. SCS, CP overhead)
        Note: slot/mini-slot alignment is not assumed here
        Note: This may not apply in all cases As discussed in the 3GPP TS RAN WG1 Meeting #88bis RAN1 Chairman's Notes, two agreements are described as follows:

88bis
Agreements:
  The duration of a data transmission in a data channel can be semi-statically configured and/or dynamically indicated in the PDCCH scheduling the data transmission
    FFS: the starting/ending position of the data transmission
    FFS: the indicated duration is the number of symbols
    FFS: the indicated duration is the number of slots
    FFS: the indicated duration is the numbers of symbols+ slots
    FFS: in case cross-slot scheduling is used
    FFS: in case slot aggregation is used
    FFS: rate-matching details
    FFS: whether/how to specify UE behavior when the duration of a data transmission in a data channel for the UE is unknown Agreement:
  UE can be configured to "monitor DL control channel" in terms of slot or OFDM symbol with respect to the numerology of the DL control channel
    Specification supports occasion of "DL control channel monitoring" per 1 symbol with respect to the numerology of the DL control channel
      Note: This may not be applied to all type of the UEs and/or use-cases
      FFS whether or not total number of blind decodings in a slot when a UE is configured with "DL control channel monitoring" per symbol can exceed the total number of blind decodings in a slot when a UE is configured with "DL control channel monitoring" per slot
  Data channel (PDSCH, PUSCH) duration and starting position
    Specification supports data channel having minimum duration of 1 OFDM symbol of the data and starting at any OFDM symbol to below-6 GHz, in addition to above-6 GHz
      Note: This may not be applied to all type of UEs and/or use-cases
      UE is not expected to blindly detect the presence of DMRS or PT-RS
      FFS: Whether a 1 symbol data puncturing can be indicated by preemption indication
      FFS: combinations of data duration and granularities of data position
    Specification supports data having frequency-selective assignment with any data duration
    FFS: relations between "DL control channel monitoring" occasions and data channel durations
    Note: this is addition to the agreements at RAN1 #86.
    Note: 1-symbol case may be restricted depending on the BW.

Two agreements, discussed in the 3GPP TS RAN AH WG1 Meeting #1706 RAN1 Chairman's Notes, are provided below. The first agreement (provided below) is related to the first DMRS (Demodulation Reference Signal) position of a PDSCH (Physical Downlink Shared Channel). Since DMRS of a PDSCH is used for channel estimation, DMRS position of the PDSCH is better to be transmitted on earlier scheduled OFDM symbol. In general, for slot-based scheduling, OFDM symbols for control may be transmitted on the beginning of a slot. Hence, for slot-based scheduling, DMRS position of a PDSCH is fixed on the $3^{rd}$ or $4^{th}$ symbol of the slot. The second agreement (provided below) describes parameters about CORESET configured by UE-specific higher-layer signalling.

NR #2

Agreements:
  For downlink, UE can be informed about the first DMRS position of the PDSCH between the following:
    Fixed on the $3^{rd}$ or $4^{th}$ symbol of the slot (for, a.k.a, slot-based scheduling)
    $1^{st}$ symbol of the scheduled data (for a.k.a non-slot-based scheduling)
      FFS: if special handling is needed for the case where some of the PRBs of the symbol of the scheduled data is overlapped with the other signals/channels
  FFS: When the UE is configured both slot-based scheduling and non-slot-based scheduling, the first DMRS position of the PDSCH can be changed between the $3^{rd}$ or $4^{th}$ symbol of the slot and $1^{st}$ symbol of the scheduled data Agreements:
  For a CORESET which is configured by UE-specific higher-layer signalling, at least following are configured.
    Frequency-domain resources, which may or may not be contiguous
      Each contiguous part of a CORESET is equal to or more than the size of REG-bundle in frequency
        FFS: exact size and number of contiguous parts for a CORESET
    Starting OFDM symbol
    Time duration
    REG bundle size if the configuration is explicit
    Transmission type (i.e., interleaved or non-interleaved)
    More parameters may be added if agreed
  For a CORESET which is configured by UE-specific higher-layer signalling, at least following is configured.
    Monitoring periodicity
      FFS: it is a configuration per CORESET or per one or a set of PDCCH candidates
      FFS: relation with DRX
      FFS: default/fallback value Two agreements, discussed in the 3GPP TS RAN WG1 Meeting #90 RAN1 Chairman's Notes, are provided below. In order to satisfy multiple services in NR, the first one lists possible signaling about time domain resource allocation in a scheduling DCI (Downlink Control Information). For example, for delay-sensitive services such as URLLC (Ultra-Reliable and Low Latency Communications), a DCI scheduling for non-slot (i.e. mini-slot) transmission is necessary to guarantee low latency requirements. Furthermore, the first agreement (as provided below) describes a UE can be informed of time domain resource allocation of the scheduled transmission by a scheduling DCI without prior information about DL (Downlink)/UL (Uplink) assignment. Based on the second agreement, possible mini-slot length is 2, 4, 7 OFDM symbols are assumed. However, for future flexibility, more mini-slot lengths are expected.

90

Agreements:
  NR supports some combinations of following:
    For the purpose of designing time-domain resource allocation scheme from UE perspective, assuming no prior information of DL/UL assignment, scheduling DCI informs the UE of the time-domain information of the scheduled PDSCH or PUSCH Following is informed to the UE:
  One-slot case:
    Starting symbol and ending symbol in the slot.
    Which slot it applies to
  Multi-slot case:
    Opt.1: Starting symbol and ending symbol of each slot of the aggregated slots, and the starting slot and ending slot where it is applied to
    Opt.2: Starting symbol and ending symbol of a slot, and the starting slot and ending slot where it is applied to
      The starting symbol and ending symbol are applied to all the aggregated slots
    Opt.3: Starting symbol, starting slot, and the ending symbol and ending slot
  Non-slot (i.e., mini-slot) case:
    Starting symbol and ending symbol
      FFS: starting symbol is:
        Opt.1: Starting symbol of a slot
          UE is also informed of which slot it applies to
        Opt.2: Symbol number from the start of the PDCCH where scheduling PDCCH is included
      FFS: ending symbol is:
        Opt.1: Ending symbol of a slot
          UE is also informed of which slot it applies to
        Opt.2: Symbol number from the starting symbol
  Scheduling DCI with and without time domain field is supported
  Note: the starting symbol is the earliest symbol of the PDSCH or PUSCH including DMRS symbol in the case of PUSCH in a slot, FFS: PDSCH
  Note: the ending symbol is the latest symbol of the PDSCH or PUSCH in a slot
  FFS: signaling aspects, e.g., implicit, explicit, table, etc.
  FFS: which are valid combinations
  FFS: handling of semi-static UL/DL and SFI assignment Agreements:
  Remove the support for 7-symbol slots from NR
    It is allowed to have more than one DL/UL switching points within a 14-symbol slot by using non-slot-based scheduling
    Note: at least 14-symbol, 7-symbol, and 2-symbol CORESET monitoring periodicities are supported for non-slot-based scheduling
    Removing 7-symbol slot does not imply to remove the agreed design of 4- to 7-symbol long PUCCH
    Allow additional DMRS position with non-slot based scheduling
  RAN1 recommends to define test cases for following cases:
    Slot-based scheduling for downlink
      The first DMRS position of the PDSCH is fixed on the 3rd or 4th symbol of the slot
    Non-slot-based scheduling for downlink
      The first DMRS position of the PDSCH is the 1st symbol of the scheduled data
      At least PDSCH durations of 2, 4, and 7 OFDM symbols including DMRS are recommended to be specified
        Note: the LS includes the motivations of selected values
    Note: Final decision is up to RAN4

Three agreements, discussed in the 3GPP TS RAN WG1 AH Meeting #1709 RAN1 Chairman's Notes, are provided below. In NR, coverage of a cell is still an issue needed to handle. The first agreement (as provided below) describes about TB repetition spanning multiple slots or mini-slots for grant-based transmission in order to solve above-mentioned issue. The second and third agreement (as provided below) are relative to dynamic SFI (Slot Format Information), wherein the second one describes the content of dynamic SFI and the third one emphasize on status "unknown" in dynamic SFI.

NR #3
Agreements:
  For grant-based DL or UL, transmissions where a TB spans multiple slots or mini-slots can be composed of repetitions of the TB
    The repetitions follow an RV sequence
      FFS how the sequence is defined in specification
      FFS if there is one repetition of the TB per slot in the case of repetitions using mini-slots
      FFS for grant-based DL or UL transmissions, if a TB can span multiple slots without repetitions
Agreements:
  Regarding dynamic SFI content definition
    The SFI carries an index to a table that is UE-specifically configured via RRC
      FFS how to manage the table for future proof
      FFS how to define entries in the table
      FFS whether to have separate or joint management of slot based SFI (SFI indicates the slot format of the corresponding slot) vs. multi-slot SFI (SFI indicates the slot format of more than one corresponding slots)
Agreements:
  Confirm the following WA
    'Unknown' resource is 'flexible' and can be overridden by at least by DCI indication; 'Unknown' is used to achieve the (FFS: exactly/approximately) the same as 'Reserved' if not overridden.
      'Unknown' is signalled at least by SFI in a group-common PDCCH
      FFS: Possibility of overridden by some types of RRC (e.g., measurement configuration)
    'Reserved' resource is 'not transmit' and 'not receive' but cannot be overridden by DCI/SFI indication.
      'Reserved' is signalled at least by RRC
    FFS: handling of 'gap'
    For semi-static DL/UL transmission direction, 'Unknown' can be informed as part of the semi-static configuration.

Some agreements, discussed in the 3GPP TS RAN WG1 Meeting #90bis RAN1 Chairman's Notes, are provided as follow. In 5G NR, time domain resource allocation of unicast transmission can be more flexible in terms of starting position and length than in LTE. The first agreement describes a DCI (Downlink Control Information) indicates an index into a UE-specific table giving OFDM symbols used for PDSCH or PUSCH (Physical Uplink Shared Channel) transmission for both slot and mini-slot scheduling. The second agreement is relative to resource set for rate matching purpose. The last three agreements are related to slot format information (SFI). In order to utilize radio resources more efficiently, it is generally better to allow NW to adjust transmission direction dynamically based on current DL and/or UL traffic.

90bis
Agreements:
  For both slot and mini-slot, the scheduling DCI can provide an index into a UE-specific table giving the OFDM symbols used for the PDSCH (or PUSCH) transmission
    starting OFDM symbol and length in OFDM symbols of the allocation
    FFS: one or more tables
    FFS: including the slots used in case of multi-slot/multi-mini-slot scheduling or slot index for cross-slot scheduling
    FFS: May need to revisit if SFI support non-contiguous allocations
  At least for RMSI scheduling
    At least one table entry needs to be fixed in the spec
Agreements:
  On the RB-symbol level, UE can be configured with one or multiple DL resource set(s), each resource set configuration includes a first bitmap of RB granularity and a second bitmap of OFDM symbols within a slot for which the first bitmap applies (i.e. the intersection of two bitmaps).
    These resource set(s) can be identified as resource sets(s) for which the PDSCH is or is not mapped based on the L1 signalling.
      FFS whether or not the presence of the information field to indicate the resource set is RRC configurable—conclude by Friday
    FFS whether a resource set is applicable in every slot or not (e.g., via a periodic configuration, etc.)
      Conclude by Friday whether or not there is RRC impact
    FFS the case of one DCI scheduling multi-slot transmission
    Note: covers future/backward compatible resource, parts of CORESETs, multiple CORESETs
    FFS L1 signaling is GC PDCCH or scheduling DCI
  CORESET(s) configured to a UE for monitoring can be included in resource set(s)
    If included, the entire COREST is assumed for rate matching when applicable
    These resource set(s) can be identified as resource sets(s) for which the PDSCH is or is not mapped based on the L1 signalling.
    FFS the configuration details of rate matching for semi-static case (w/o L1 signalling)
Agreements:
  The single slot format table supports up to two D/U switching points per slot
    Zero switching point: 14 DL symbols, or 14 unknown symbols, or 14 UL symbols.
    One D/U switching point of all combinations: Start with zero or more DL symbols, end with zero or more UL symbols, and with unknown symbols in between, where there is at least one unknown symbol and one DL or UL symbol.
    Two D/U switching points within a slot: The first 7 symbols start with zero or more DL symbols, ends with at least one UL symbol at symbol #6 with zero or more unknown symbols in between. The second 7 symbols starts with one or more DL symbols and ends with zero or more UL symbols with zero or more unknown symbols in the middle.
    Note: This single slot slot format table will be captured in RAN1 spec. In Rel.15, RAN1 will specify up to X<[256] entries, but the RRC signaling need to consider future compatibility with more entries and from RAN1 perspective, a total of [256] entries in the RRC signalling is necessary (with only X entries specified in Rel-15 in RAN1)
Agreements:
  For the UE specific single-slot/multi-slotset SFI table configuration
    Each entry of the table indicates a sequence of configured single-slot slot formats Note if the sequence length is 1, the entry is a single-slot slot format Note if the sequence length is more than one, the entry is a multi-slot slot format Note that it is possible all the slots in a multi-slot slot-format can have the same slot format Note The entries in the table can be of different length including a mix of single slot SFI and multi-slot SFI The length of each entry in the table is FFS, e.g., multiple of configured GC-PDCCH monitoring period, a fraction of the configuration GC-PDCCH monitoring period, etc.

Agreements:

GC-PDCCH for dynamic SFI monitoring

For same cell GC-PDCCH monitoring: UE is required to monitor at most one GC-PDCCH per spatial QCL per configuration period carrying dynamic SFI in the active BWP in the cell The coreset(s) is located in the first 1/2/3 symbols in a slot Configuration of GC-PDCCH for UE to monitor is FFS especially considering interaction with BWP configuration Note: This is not intended to address the case of multi-TRP which is deprioritized before Dec.

When configuring the GC-PDCCH monitoring for dynamic SFI, the gNB will configure the payload length When configuring the GC PDCCH monitoring for dynamic SFI for a serving cell, the gNB will configure the location of the bits used for the dynamic SFI in the payload Some targets of URLLC are discussed in 3GPP TR 38.802 as follows:

Control Plane Latency

Control plane latency refers to the time to move from a battery efficient state (e.g., IDLE) to start of continuous data transfer (e.g., ACTIVE).

The target for control plane latency should be 10 ms.

Analytical evaluation is used as the evaluation methodology.

NOTE1: For satellite communications link, the control plane should be able to support RTT of up to 600 ms in the case of GEO and HEO, up to 180 ms in the case of MEO, and up to 50 ms in the case of LEO satellite systems.

User Plane Latency

The time it takes to successfully deliver an application layer packet/message from the radio protocol layer 2/3 SDU ingress point to the radio protocol layer 2/3 SDU egress point via the radio interface in both uplink and downlink directions, where neither device nor Base Station reception is restricted by DRX.

For URLLC the target for user plane latency should be 0.5 ms for UL, and 0.5 ms for DL. Furthermore, if possible, the latency should also be low enough to support the use of the next generation access technologies as a wireless transport technology that can be used within the next generation access architecture.

NOTE1: The reliability KPI also provides a latency value with an associated reliability requirement. The value above should be considered an average value and does not have an associated high reliability requirement.

For eMBB, the target for user plane latency should be 4 ms for UL, and 4 ms for DL.

NOTE2: For eMBB value, the evaluation needs to consider all typical delays associated with the transfer of the data packets in an efficient way (e.g. applicable procedural delay when resources are not preallocated, averaged HARQ retransmission delay, impacts of network architecture).

When a satellite link is involved in the communication with a user equipment, the target for user plane RTT can be as high as 600 ms for GEO satellite systems, up to 180 ms for MEO satellite systems, and up to 50 ms for LEO satellite systems.

NOTE3: For the satellite case, the evaluation needs to consider the max RTT that is associated with the GEO satellite systems.

Analytical evaluation is used as the evaluation methodology.

Reliability

Reliability can be evaluated by the success probability of transmitting X bytes within a certain delay, which is the time it takes to deliver a small data packet from the radio protocol layer 2/3 SDU ingress point to the radio protocol layer 2/3 SDU egress point of the radio interface, at a certain channel quality (e.g., coverage-edge).

A general URLLC reliability requirement for one transmission of a packet is $1-10^{-5}$ for 32 bytes with a user plane latency of 1 ms.

For eV2X, for communication availability and resilience and user plane latency of delivery of a packet of size [300 bytes], the requirements are as follows:

Reliability=$1-10^{-5}$, and user plane latency=[3-10 msec], for direct communication via sidelink and communication range of (e.g., a few meters)

Reliability=$1-10^{-5}$, and user plane latency=[2] msec, when the packet is relayed via BS.

Note that target communication range and reliability requirement is dependent of deployment and operation scenario (e.g., the average inter-vehicle speed).

Link level evaluation with deployment scenario specific operating point and system level simulation are to be performed for the evaluations are Indoor Hotspot, Urban Macro, Highway, and Urban grid for connected car.

[Editor's notes: other KPIs and use cases for eV2X may be added if needed after progress in SA1.]

NOTE: Other reliability requirements may be added, if needed, e.g. for critical communications relating to high-speed train.

A running CR is described in 3GPP R1-171751 as provided below. his is relative to LTE sTTI (shortened TTI). A UE can distinguish scheduling DCI is for 1 ms subframe scheduling or sTTI scheduling by different DCI formats as quotation DCI format 7-0A for uplink and DCI format 7-1A for downlink.

5.3.3.1.15 Format 7-0A

DCI format 7-0A is used for the scheduling of PUSCH with slot or subslot duration in one UL cell. The following information is transmitted by means of the DCI format 7-0A:

Flag for format7-0A/format7-1A differentiation-1 bit, where value 0 indicates format 7-0A and value 1 indicates format 7-1A Resource block assignment—X bits Modulation and coding scheme—5 bits as defined in section 8.6 of [3]

HARQ process number—X bits

New data indicator—1 bit

Redundancy version—2 bits

TPC command for scheduled PUSCH—2 bits as defined in section 5.1.1.1 of [3]

DMRS position indicator—2 bits as defined in section 5.5.2.1.2 in [2] (The field is present only for PUSCH with subslot duration)

Cyclic shift for DMRS and IFDMA configuration—X bits as defined in section 5.5.2.1.1 of [2]

UL index—X bits as defined in sections x.x.x of [3]

Downlink Assignment Index (DAI)—X bits as defined in section 7.3 of [3]

CSI request—X bits as defined in section x.x.x of [3].

SRS request—0 or 1 bit. The interpretation of this field is provided in section 8.2 of [3]

Cyclic Shift Field mapping table for DMRS—1 bit as defined in section 5.5.2.1.1 of [2].

If the number of information bits in format 7-0A mapped onto a given search space is less than the payload size of format 7-1A for scheduling the same serving cell and mapped onto the same search space (including any padding bits appended to format 7-1A), zeros shall be appended to format 7-0A until the payload size equals that of format 7-1A.

5.3.3.1.16 Format 7-1A

DCI format 7-1A is used for the scheduling of one PDSCH codeword with slot or subslot duration in one cell.

The following information is transmitted by means of the DCI format 7-1A:

Flag for format7-0A/format7-1A differentiation—1 bit, where value 0 indicates format 7-0A and value 1 indicates format 7-1A Resource block assignment—X bits Modulation and coding scheme—5 bits as defined in section 7.1.7 of [3]

HARQ process number—X bits

New data indicator—1 bit

Redundancy version—2 bits

TPC command for slot-SPUCCH or subslot-SPUCCH—2 bits as defined in section 5.1.2.1 of [3]

DMRS position indicator—X bits as defined in section x.x.x in [2] (The field is present only for PDSCH with subslot duration)

Downlink Assignment Index—X bits as defined in section 7.3 of [3]

Used/Unused SPDCCH resource indication—X bits (This field is present if the DCI is mapped to SPDCCH)

SPUCCH resource indication—2 bit as defined in section x.x of [3].

Aperiodic zero-power CSI-RS resource indicator for PDSCH RE Mapping—2 bits as defined in sections 7.1.9 and 7.2.7 of [3]. This field is present only when the UE is configured with CSI-RS-ConfigZPAperiodic.

If the UE is configured to decode SPDCCH CRC scrambled by the C-RNTI and the number of information bits in format 7-1A mapped onto a given search space is less than that of format 7-0A for scheduling the same serving cell and mapped onto the same search space, zeros shall be appended to format 7-1A until the payload size equals that of format 7-0A, except when format 7-1A assigns downlink resource on a secondary cell without an uplink configuration associated with the secondary cell.

In 3GPP TS 38.211, numerology is defined as subcarrier spacing and CP length as follows:

4.0 Frame Structure and Physical Resources

Throughout this specification, unless otherwise noted, the size of various fields in the time domain is expressed as a number of time units $T_s = 1/(\Delta f_{max} \cdot N_f)$ where $\Delta f_{max} = 480 \cdot 10^3$ Hz and $N_f = 4096$.

4.1 OFDM Numerologies

Multiple OFDM numerologies are supported as given by Table 4.1-1.

Table 4.1-1 of 3GPP TS 38.211 V0.1.0, Entitled "Supported Transmission Numerologies", is Reproduced as FIG. 5

One contiguous resource allocation type, as described in 3GPP TS 36,213, is provided below. An RIV (Resource Indication Value) is associated with/represents a contiguous resource allocation pattern. In addition, a RIV is calculated based on the quotation below.

7.1.6.3 Resource Allocation Type 2

In resource allocations of type 2, the resource block assignment information indicates to a scheduled UE a set of contiguously allocated localized virtual resource blocks or distributed virtual resource blocks. In case of resource allocation signalled with PDCCH DCI format 1A, 1B or 1D, one bit flag indicates whether localized virtual resource blocks or distributed virtual resource blocks are assigned (value 0 indicates Localized and value 1 indicates Distributed VRB assignment) while distributed virtual resource blocks are always assigned in case of resource allocation signalled with PDCCH DCI format 1C. Localized VRB allocations for a UE vary from a single VRB up to a maximum number of VRBs spanning the system bandwidth. For DCI format 1A the distributed VRB allocations for a UE vary from a single VRB up to $N_{VRB}^{DL}$ VRBs, where $N_{VRB}^{DL}$ is defined in [3], if the DCI CRC is scrambled by P-RNTI, RA-RNTI, or SI-RNTI. With PDCCH DCI format 1B, 1D, or 1A with a CRC scrambled with C-RNTI, distributed VRB allocations for a UE vary from a single VRB up to $N_{VRB}^{DL}$ VRBs if $N_{RB}^{DL}$ is 6-49 and vary from a single VRB up to 16 if $N_{RB}^{DL}$ is 50-110. With PDCCH DCI format 1C, distributed VRB allocations for a UE vary from $N_{RB}^{step}$ VRB(s) up to $\lfloor N_{VRB}^{DL}/N_{RB}^{step} \rfloor \cdot N_{RB}^{step}$ VRBs with an increment step of $N_{RB}^{step}$, where $N_{RB}^{step}$ value is determined depending on the downlink system bandwidth as shown in Table 7.1.6.3-1.

Table 7.1.6.3-1 of 3GPP TS 36.213 V8.8.0, Entitled "$N_{RB}^{Step}$ Values Vs. Downlink System Bandwidth", is Reproduced as FIG. 6

For PDCCH DCI format 1A, 1B or 1D, a type 2 resource allocation field consists of a resource indication value (RIV) corresponding to a starting resource block ($RB_{start}$) and a length in terms of virtually contiguously allocated resource blocks $L_{CRBs}$. The resource indication value is defined by if $(L_{CRBs} - 1) \le \lfloor N^{DL}_{RB}/2 \rfloor$ then
  $RIV = N^{DL}_{RB}(L_{CRBs} - 1) + RB_{start}$
else
  $RIV = N^{DL}_{RB}(N^{DL}_{RB} - L_{CRBs} + 1) + (N^{DL}_{RB} - 1 - RB_{start})$ where $L_{CRBs} \ge 1$ and shall not exceed $N_{VRB}^{DL} - RB_{start}$.

For PDCCH DCI format 1C, a type 2 resource block assignment field consists of a resource indication value (RIV) corresponding to a starting resource block ($RB_{start} = 0$, $N_{RB}^{step}$, $2N_{RB}^{step}$, ..., $(\lfloor N_{VRB}^{DL}/N_{RB}^{step} \rfloor - 1)N_{RB}^{step}$ and a length in terms of virtually contiguously allocated resource blocks ($L_{CRBs} = N_{RB}^{step}$, $2N_{RB}^{step}$, ..., $\lfloor N_{VRB}^{DL}/N_{RB}^{step} \rfloor \cdot N_{RB}^{step}$). The resource indication value is defined by if $(L'_{CRBs} -1) \leq \lfloor N'^{DL}_{RB} / 2 \rfloor$ then
    $RIV = N'^{DL}_{VRB} (L'_{CRBs} -1) + RB'_{START}$
else
    $RIV = N'^{DL}_{VRB} (N'^{DL}_{VRB} - L'_{CRBs} +1) + (N'^{DL}_{VRB} -1 - RB'_{start})$
where $L'_{CRBs} = L_{CRBs} / N^{step}_{RB}$, $RB'_{start} = RB_{start} / N^{step}_{RB}$ and $N'^{DL}_{VRB} = \lfloor N^{DL}_{VRB} / N^{step}_{RB} \rfloor$. Here, $L'_{CRBs} \geq 1$ and shall not exceed $N'^{DL}_{VRB} - RB'_{start}$.

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

NR-PDCCH: A channel carries downlink control signal which is used to control communication between a UE and a network side. A network transmits NR-PDCCH on configured control resource set (CORESET) to the UE.

UL-control signal: An UL-control signal may be scheduling request(SR), channel state information(CSI), HARQ-ACK/NACK for downlink transmission Slot: A scheduling unit in NR. Slot duration is 14 OFDM symbols.

Mini-slot: A scheduling unit with duration less than 14 OFDM symbols.

Slot format information (SFI): Information of slot format of symbols in a slot. A symbol in a slot may belong to following type: downlink, uplink, unknown, empty or other. The slot format of a slot could at least convey transmission direction of symbols in the slot.

DL common signal: data channel carrying common information that targets for multiple UEs in a cell or all UEs in a cell. Example of DL common signal could be system information, paging, RAR.

DL URLLC: A type of DL transmission which requires very high reliability and very low latency. To fulfill the latency requirement, an example is to transmit DL URLLC in a mini-slot, e.g. the data duration could be less than 1 slot such as 1~4 OFDM symbol(s) and there may be one or multiple monitoring occasions for DL URLLC control in a slot. In this example, a UE is configured with a CORESET to monitor for DL URLLC control indicating DL URLLC transmission. The CORESET can be configured on middle symbol of a slot. The DL URLLC transmission may be transmitted on the following few symbols of the CORESET.

In wireless communication system, transmission directions, including downlink from NW (e.g. BS) to a UE and uplink from UE to NW, need to be configured appropriately.

In LTE, time duration of a scheduled data channel (PDSCH or PUSCH) is within a subframe excluding OFDM symbols used for other purpose such as for transmitting downlink control information and/or GAP, UL OFDM symbol considering frame structure type 2 (TDD). Furthermore, UEs are configured with a frame structure type during initial access procedure and be aware of a number of OFDM symbols for downlink control information by decoding PCFICH (Physical Control Format Indicator Channel). Hence, UEs can know time duration of a scheduled data channel, and there is no need to indicate time duration of the scheduled data channel in a downlink control signal.

In 5G NR, multiple services with different requirements are expected to be supported. The services can be broadly and generally classified as follows: services requiring very low latency and high reliability (i.e. Ultra Reliable Low Latency Communication (URLLC)), services requiring very high data rates (i.e. Enhanced Mobile Broadband (eMBB)), and/or services with enhanced coverage (i.e. Massive Machine Type Communication (mMTC)). However, different services mentioned above may need different time duration for data channel to meet each requirement. For example, it would be beneficial to transmit on a fewer number of OFDM symbols to meet URLLC requirement; however, for other services, latency may not be the highest priority.

Hence, multiple time domain resource allocation schemes are proposed in 3GPP TSG RANWG1 Meeting #90 RAN1 Chairman's Notes. Based on 3GPP TSG RAN WG1 Meeting #88bis RAN1 Chairman's Notes, in order to dynamically allocate data channel, time duration of a data channel indicated in a DCI is proposed. Based on 3GPP TSG RAN WG1 Meeting #90bis RAN1 Chairman's Notes, a UE-specific table is configured for a UE, and each entry in the table represents a time domain resource allocation pattern possibly comprising a starting OFDM symbol and length or duration for a data channel (PDSCH or PUSCH). A UE receives a scheduling DCI indicating an index of one entry in the UE-specific table for time domain resource allocation of scheduled data transmission (PDSCH or PUSCH).

Based on 3GPP TSG RAN WG1 Meeting #87 RAN1 Chairman's Notes, minimum granularity for monitoring DCI may be different in case of slot scheduling and mini-slot scheduling. For slot-scheduling, CORESET(s) (control resource set) may exist at the beginning of a slot which means once per slot. For mini-slot scheduling, it would be beneficial to configure CORESET(s) starting OFDM symbol (or the first OFDM symbol) in the middle of a slot to meet delay-sensitive services (e.g. URLLC). Taking the range of each time domain resource allocation pattern equal to one slot as an example (ranges greater or smaller than one slot are also possible), the concerned problem is illustrated below.

Figure 10:
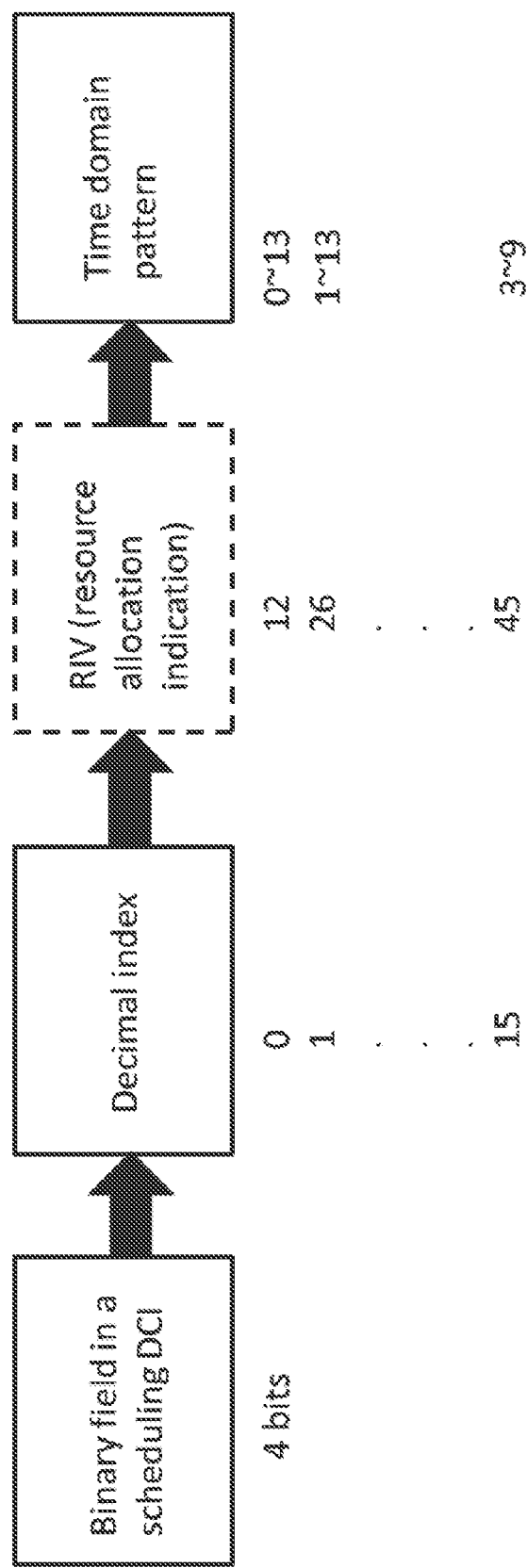
FIG. 10 is an exemplary diagram according to one embodiment.

Considering a CORESET may start in the middle of a slot, if a time domain resource allocation pattern in the UE-specific table indicates resource allocation starting before the CORESET, the UE will need to receive and buffer OFDM symbols before monitoring the CORESET. For example, as shown in FIG. 10, a CORESET starts at OFDM symbol index #2 and a UE receives a DCI indicating time pattern with resource allocation starting from OFDM symbol index #0 with length 14 (e.g. the decimal index in DCI=0). Buffering the received signal/data not only induces complexity but also requires extra memories in UE. Besides, a UE in LTE generally only needs to receive data after decoding the DCI. Thus, attempting to receive data even if there is no DCI indicating the presence of data will cause UE power consumption unnecessarily. Hence, how a UE interprets the UE-specific table properly when receiving scheduling DCI on CORESET starting in the middle of a slot needs to be considered. Potential solutions are described below.

A UE is configured with at least a control resource set (CORESET). The control resource set starts at an OFDM symbol index. The UE receives a DCI on the control resource set scheduling data transmission. The DCI indicates an index pointing to an entry in a UE-specific table configured by a NW. The UE receives scheduled data on resources with time domain allocated according to the index and an offset.

A slot comprises 14 symbols. In one example embodiment, time domain resource allocation (e.g. within a slot) carried in DCI is contiguous in time domain. Considering contiguous time domain resource allocation of a slot, there could be 105 time domain resource allocation patterns. In another example embodiment, time domain resource allocation (e.g. within a slot) carried in DCI is non-contiguous in time domain.

Considering non-contiguous time domain resource allocation of a slot, a NW may configure a UE with possible non-contiguous time domain resource allocation patterns. Non-contiguous resource allocation of a slot can be indicated by a bit map, e.g. with length equal to number of OFDM symbol in a slot (14) and each bit in the bitmap indicates whether a symbol in a slot is allocated. Alternatively, non-contiguous resource allocation of a slot can be indicated by contiguous time domain resource allocation of a slot and a DL resource set.

A UE may be configured with at least one DL resource set by a NW and each DL resource set may indicate which OFDM symbols within a slot (or multiple slots) are allocated for PDSCH. More specifically, the NW can indicate the DL resource set to the UE by a DCI. Alternatively the DCI may be the scheduled DCI. If there is no indication by the NW, the UE cannot use the DL resource set.

Figure 12A:
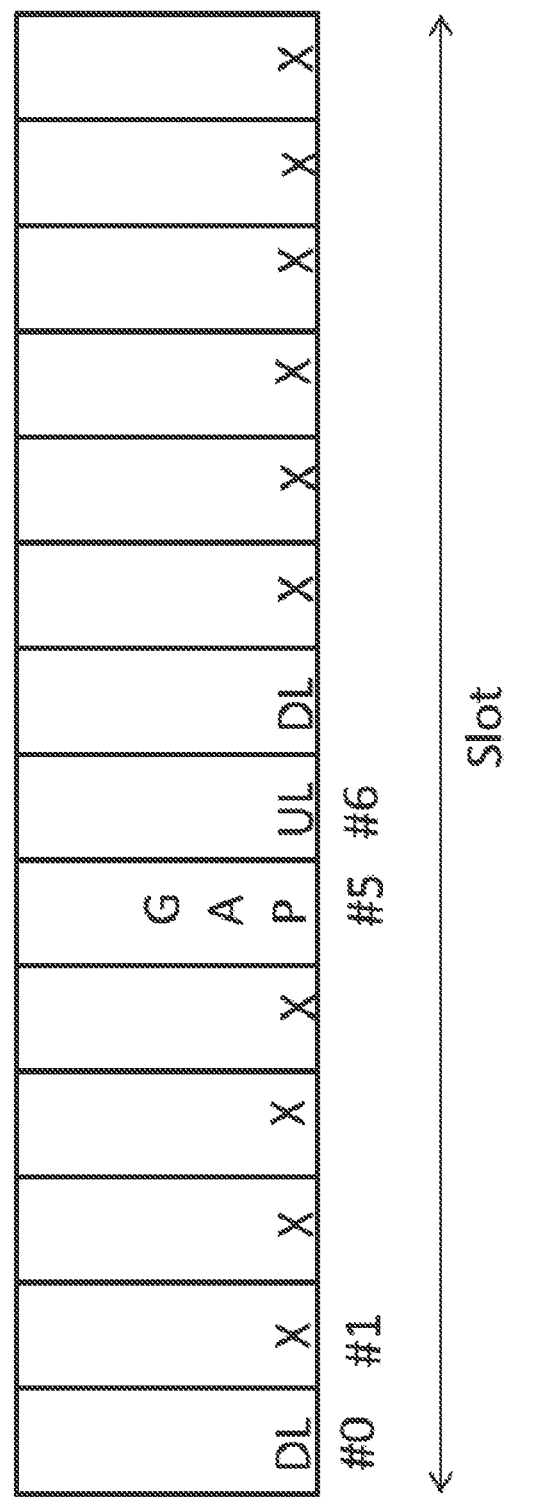
FIGS. 12A and 12B are exemplary diagrams according to one embodiment.

For example, a slot with a SFI as shown in FIG. 12A is known by a UE. The UE is configured with a DL resource set indicating OFDM symbol index #5 and index #6 are reserved (i.e. not allocated for PDSCH). In FIG. 12A, X represents "Unknown", DL represents a downlink transmission, and UL represents an uplink transmission. As shown FIG. 12A, with the contiguous time domain resource allocation pattern and the resource set indicated in the DCI or an upper layer signaling, the UE can know that all the time domain resource in the contiguous time domain resource allocation pattern except OFDM symbol index #5 and index #6 are allocated to the UE. The UE receives the scheduled data based on the contiguous time domain resource allocation pattern and rate match around the DL resource set.

Figure 12B:
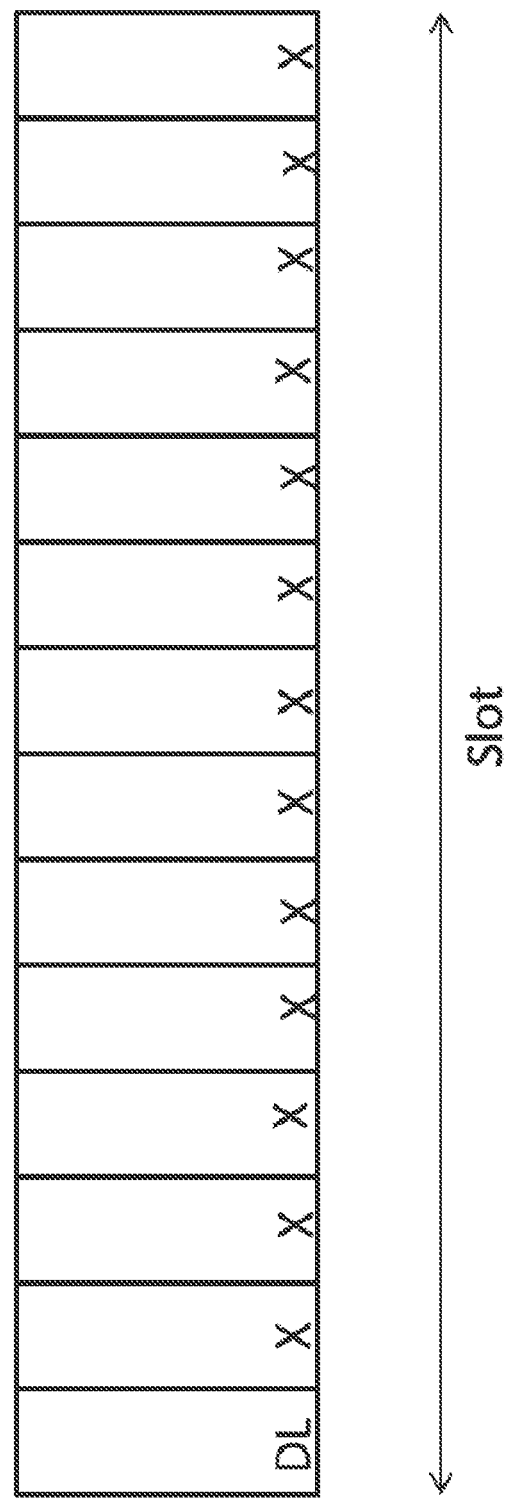

As shown in FIG. 12B, if the UE misses the SFI of the slot, the UE can receive scheduled data based on the contiguous time domain resource allocation pattern and the indication about the DL resource set. In FIG. 12B, X represents "Unknown", and DL represents a downlink transmission. As shown in FIG. 12B, a DL resource set can be configured in the middle of a slot in order to rate match around UL OFDM symbol index when SFI is missed.

Figure 7:
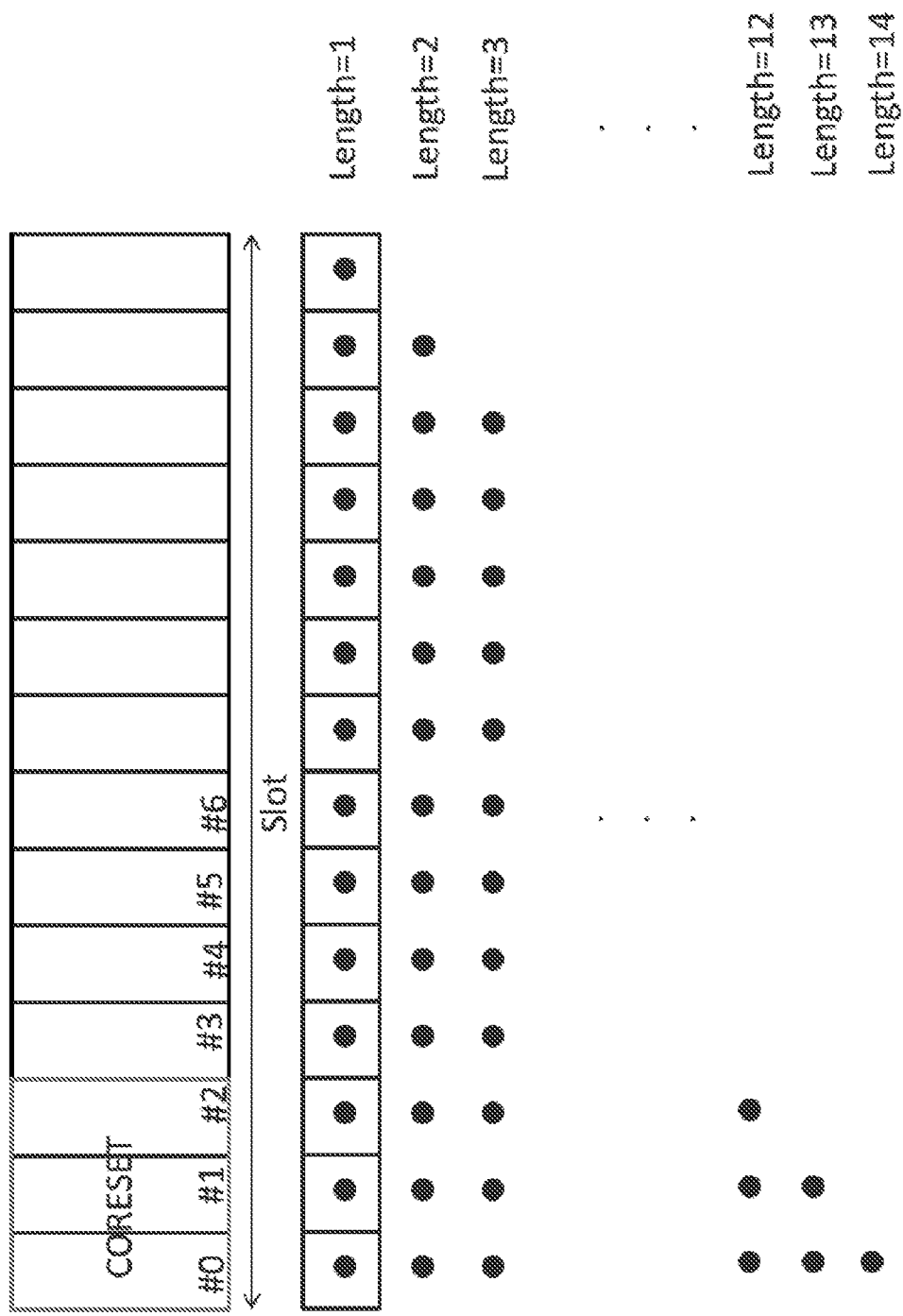
FIG. 7 is an exemplary diagram according to one embodiment.

Each time domain resource allocation pattern may be associated with or represented by a RIV (Resource Indication Value). For example, as illustrated in FIG. 7, considering the range of time domain resource allocation patterns with a slot, each dot represents a time domain resource allocation pattern from a starting OFDM symbol to an ending OFDM symbol and different time domain resource allocation patterns may have different symbol lengths. Different starting OFDM symbol indexes may have different number of time domain resource patterns. For example, the starting OFDM symbol index #0 has 14 time domain resource patterns, the starting OFDM symbol index #1 has 13 time domain resource patterns, . . . , and the starting OFDM symbol index #13 has 1 time domain resource pattern.

Figure 8:
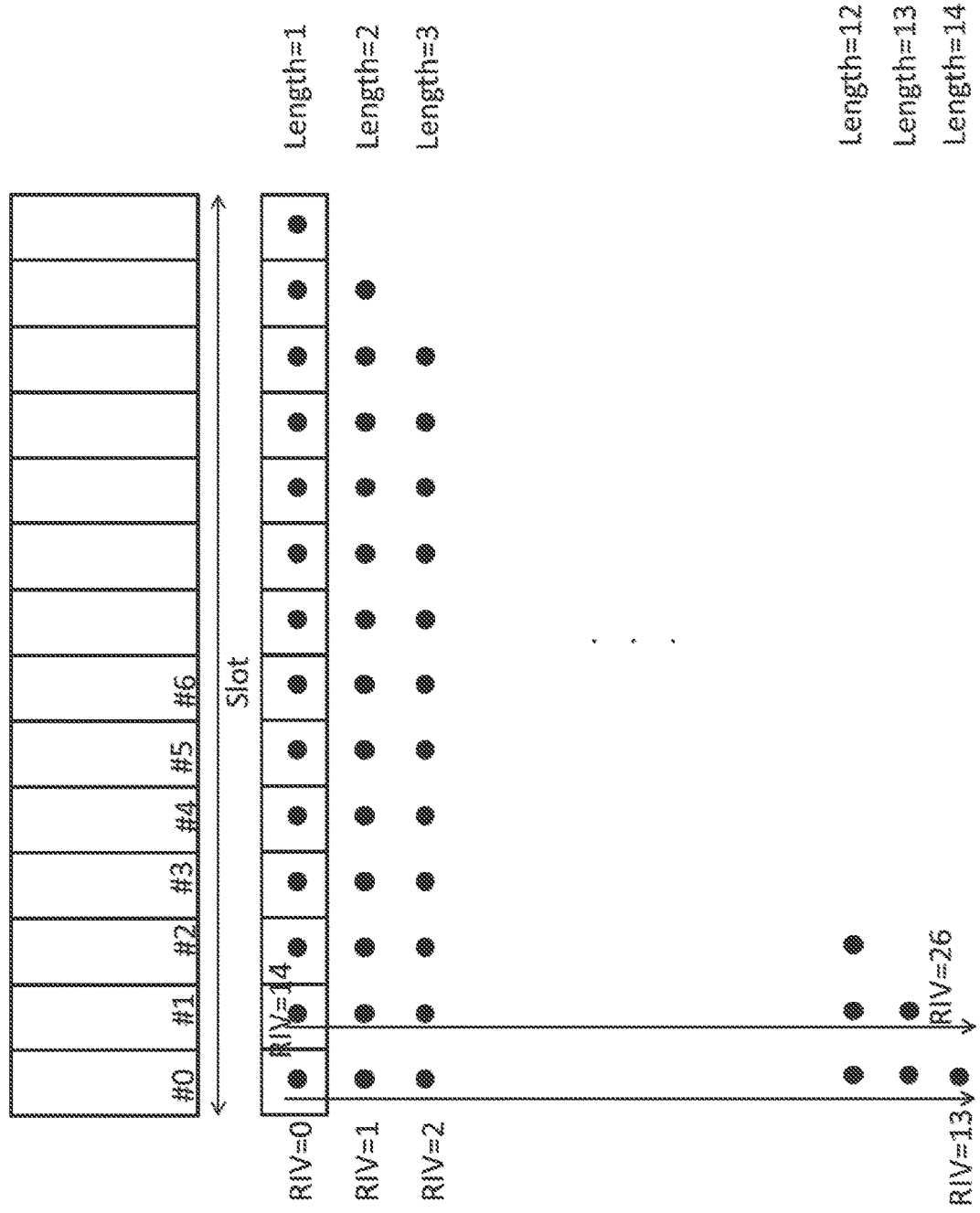
FIG. 8 is an exemplary diagram according to one embodiment.

The RIV indexing rule is the initial RIV value "0" is assigned to the time domain resource pattern with starting OFDM symbol index #0 and symbol length of 1, the RIV indexes increase by keeping the same starting OFDM symbol index and increasing the symbol lengths until the maximum symbol length of 14, the next set of RIV indexes then start from the next starting OFDM symbol index (i.e. #1), and so on For example, as shown in FIG. 8, OFDM symbol index #0 has 14 possible time domain resource allocation patterns indexed as 0 to 13. Followed by OFDM symbol index #1, time domain resource allocation patterns are indexed as 14 to 26.

Figure 9:
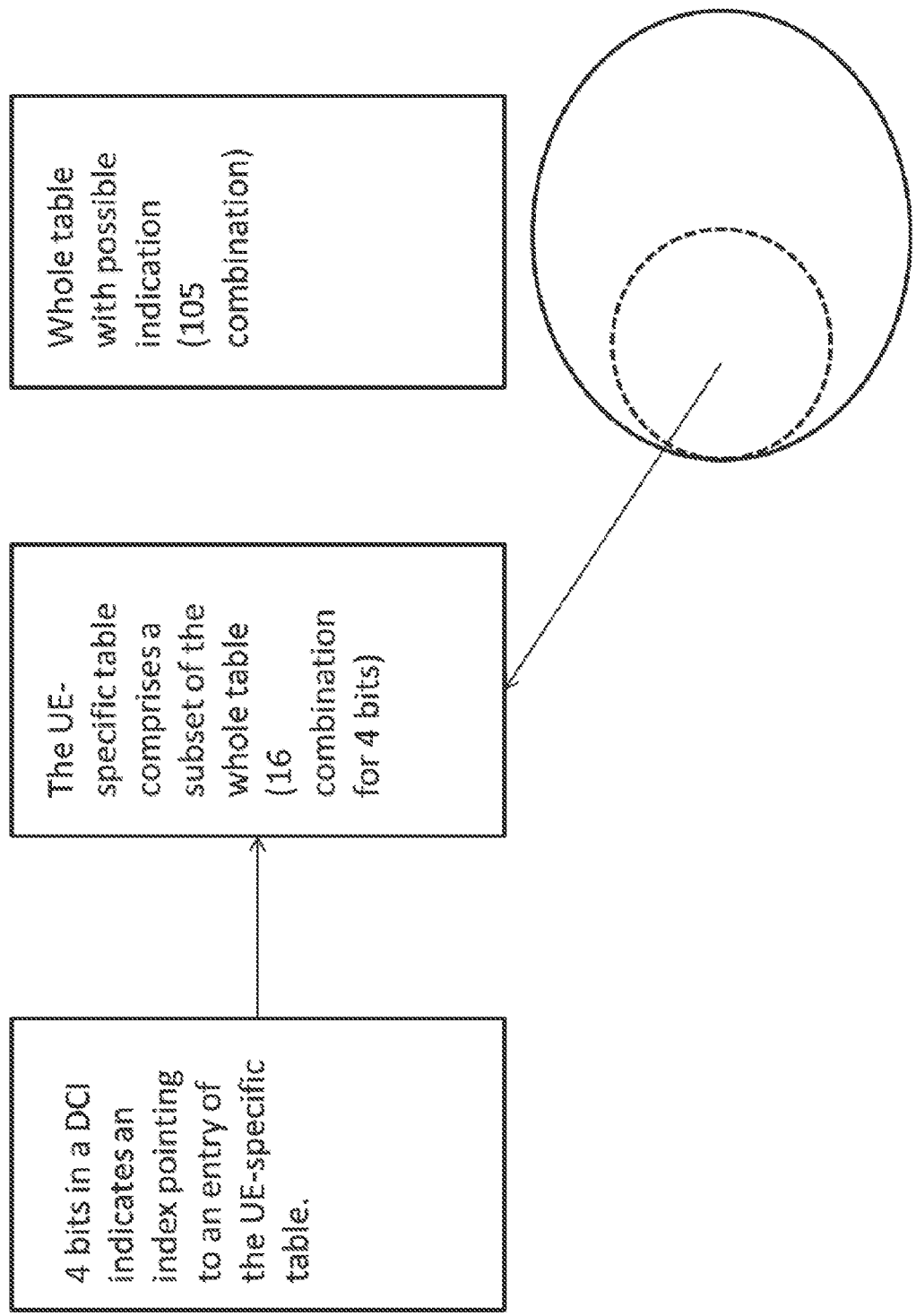
FIG. 9 is an exemplary diagram according to one embodiment.

The UE-specific table could be a subset of whole possible time domain resource allocation patterns. Alternatively, the UE-specific table could comprise whole possible time domain resource allocation patterns. Each entry of the UE-specific table represents a time domain resource allocation pattern. A number of binary bits in the DCI indicate the index. The number of bits should be able to represent all entries in the UE-specific table. Alternatively, the number of bits may represent whole possible time domain resource allocation patterns of a slot. For example, as shown in FIG. 9, assuming that there are 4 bits in the DCI indicating the index of an entry in the UE-specific table which is a subset of whole contiguous time domain resource allocation patterns. As illustrated in FIG. 10, 4 bits in the DCI of '1111' (i.e. 15 in decimal) points to an entry in the UE-specific table which is a time domain resource allocation pattern with resource allocation starting from OFDM symbol index #3 to #9.

The CORESET configuration comprises at least a starting OFDM symbol index of the CORESET. If the starting OFDM symbol index is #0, the offset is 0 and the UE interprets the UE-specific table by mapping time domain resource allocation pattern of each entry into a pattern starting from the starting OFDM symbol index of the CORESET. Considering that the CORESET may span for at most 3 OFDM symbols, the data may be scheduled overlapping with the CORESET region or after the CORESET region, depending on whether all CORESET resources are used. For flexibility, a number of OFDM symbols could be further added as the offset. More specifically, the number may be derived by the UE according to information received from NW. Alternatively, the number may be configured by NW or specified in the standards. For example, if the number is equal to 1 OFDM symbol, it means the UE could only be scheduled after the offset (i.e. 1 OFDM symbol) i.e. the UE will not be scheduled in OFDM symbol index #0. If the starting OFDM symbol index of the CORESET is not #0, the offset is determined according to the starting OFDM symbol index as described below.

Figure 11:
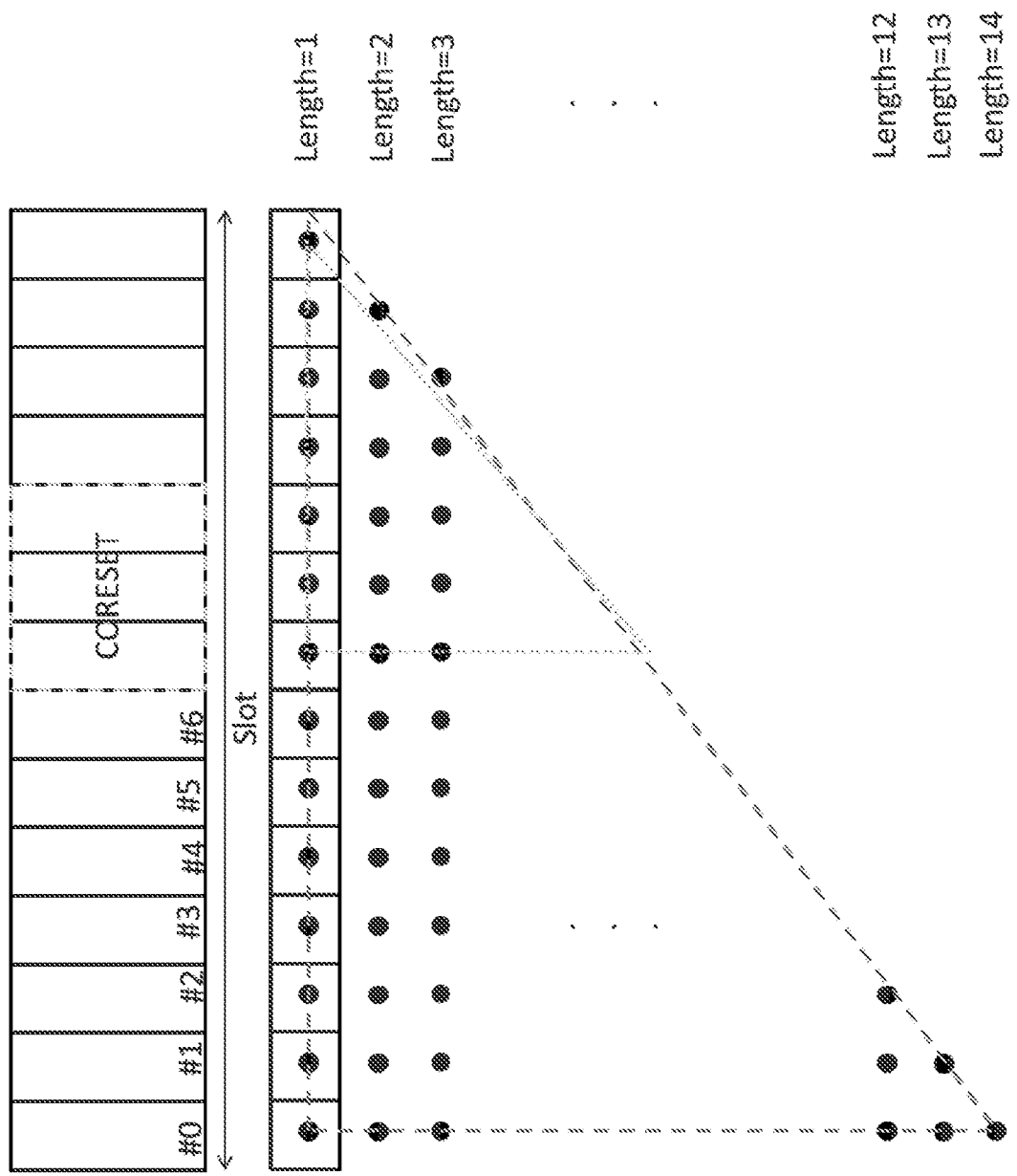
FIG. 11 is an exemplary diagram according to one embodiment.

If the starting OFDM symbol index of an entry of the UE-specific table is less than the starting OFDM symbol index of the CORESET, the UE interprets the UE-specific table based on the starting OFDM symbol index of the CORESET. For example, as shown in FIG. 11, assuming time pattern of each entry of the UE-specific table is chosen from the big triangle, if the starting OFDM symbol index of the CORESET is #7, the mapping is from big triangle to small triangle in which the patterns start from OFDM symbol index #7 i.e. each time domain resource allocation pattern is shifted to the right side by 7 OFDM symbols. In this situation, the offset is equal to 7 OFDM symbols. For flexibility, a number of OFDM symbols described above could be further added to the starting OFDM symbol index of the CORESET as the offset. Although the time domain resource allocation patterns shown in FIG. 10 are limited to one slot, it is also possible that the time domain resource allocation patterns (before or after the mapping) may cross the slot boundary so that data can be scheduled cross the slot boundary.

In one embodiment, a mapping way interpreted by the UE is that if the starting OFDM symbol index of time domain resource allocation pattern of an entry in the UE-specific table is smaller than the OFDM symbol index of the CORESET, the starting OFDM symbol index of the time domain resource allocation pattern of the entries adds the offset. More specifically, the offset value is equal to the starting OFDM symbol index of the CORESET. For example, as shown in FIG. 10, considering the starting OFDM symbol index of the CORESET is #2, time patterns of first entry and second entry are interpreted by the UE via adding the offset to the starting OFDM symbol indexes of the first entry and the second entry. That is the time domain resource allocation pattern of the first entry spans from symbol #2 to symbol #13 and the time domain resource allocation pattern of the second entry spans from symbol #3 to symbol #13. In other words, the time domain of the scheduled data is determined by a time domain resource allocation pattern and an offset, wherein the starting OFDM symbol of the scheduled data is equal to the starting OFDM symbol index of time domain resource allocation pattern plus the offset. More specifically, the offset value is the starting OFDM symbol index of the CORESET. For flexibility, a number of OFDM symbols could be further added to the starting OFDM symbol index of the CORESET as the offset.

In one embodiment, a mapping way is that RIV of time domain resource allocation pattern is interpreted based on the offset. The offset value is sum of number of RIV starting from OFDM symbol index(s) smaller than the starting OFDM symbol index of the CORESET. For example, if RIV is indexed as illustrated in FIG. 8 and the starting OFDM symbol index of the CORESET is #7, the offset is 77 calculated as sum of a respective number of RIVs of OFDM symbol indexes from #0 to #6. Considering an ordinary RIV of an entry of the UE-specific table which is 13, updated RIV is 90 based on following equation 13 mod (105-77)+77. Time domain of the scheduled data is indicated by the index pointing to an entry of the UE-specific table where ordinary RIV of the entry is updated based on a following calculation that performs a modulo operation on the RIV with the possible number of RIVs and and adds the offset (in other words taking mod possible number of RIVs and adding the offset).

In one embodiment, a mapping way interpreted by the UE is that if the starting OFDM symbol index of time domain resource allocation pattern of an entry in the UE-specific table is smaller than the OFDM symbol index of the CORESET, an offset is added to the time domain resource allocation pattern for determining the time domain of the scheduled data. Otherwise, there is no need to add the offset and the time domain resource allocation pattern remains the same. More specifically, the offset value is the starting OFDM symbol index of the CORESET. For example, as shown in FIG. 10, the time domain resource allocation pattern of the first entry and the second entry in the UE-specific table needs to add the offset and the last entry remains the same in case the starting OFDM symbol index of the CORESET is #2.

Figure 13:
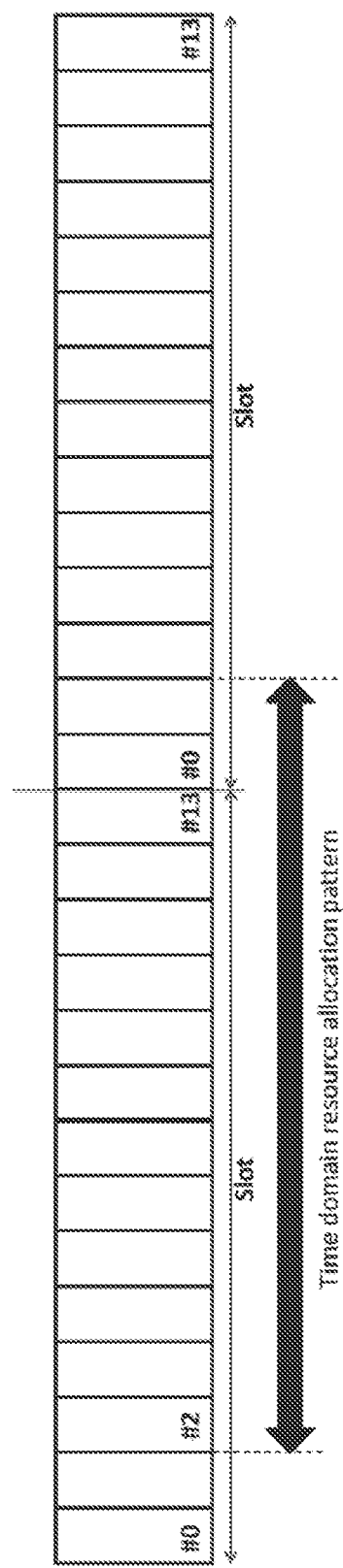
FIG. 13 is an exemplary diagram according to one embodiment.

If the length of time domain resource allocation pattern of the entries adding the offset is larger than the slot length, the OFDM symbols with indexes exceeding the slot boundary will appear in the beginning of next slot. For example, as illustrated in FIG. 10, considering the starting OFDM symbol index of the CORESET is #2, time patterns of the first entry and the second entry are interpreted by the UE via adding the offset. That is the time domain resource allocation pattern of the first entry spans from symbol #2 to symbol #13 and the last two OFDM symbols of the resource allocation pattern (i.e. symbols #14 and #15) appear in the beginning of the next slot. FIG. 13 further illustrates the occupied OFDM symbols of the time domain resource allocation pattern of the first entry.

Similarly, the time domain resource allocation pattern of the second entry in FIG. 10 spans from symbol #3 to symbol #13 and the last two OFDM symbols of the resource allocation pattern (i.e. symbols #14 and #15) appear in the beginning of the next slot. In other words, the time domain of the scheduled data is determined by a time domain resource allocation pattern and an offset, wherein the starting OFDM symbol of the scheduled data is equal to the starting OFDM symbol index of time domain resource allocation pattern plus the offset. More specifically, the offset value is equal to the starting OFDM symbol index of the CORESET.

Alternatively, if the length of time domain resource allocation pattern of the entries plus the offset is larger than the slot length, the OFDM symbols with indexes exceeding slot boundary may be ignored by the UE. For example, as shown in FIG. 10, considering the starting OFDM symbol index of the CORESET is #2, time patterns of the first entry and the second entry is interpreted by the UE via adding the offset. That is the time domain resource allocation pattern of the first entry spans from symbol #2 to symbol #13 and the time domain resource allocation pattern of the second entry spans from symbol #3 to symbol #13. Length of the time domain resource allocation pattern of the first entry and the second entry interpreted by the UE is reduced. Two last OFDM symbols of the time domain resource allocation pattern of the first entry and the second entry are ignored by the UE. For flexibility, a number of OFDM symbols described above could be further added to the starting OFDM symbol index of the CORESET as the offset.

In one embodiment, a mapping way interpreted by the UE is that an offset is added to the time domain resource allocation patterns of entries in the UE-specific table no matter whether the starting OFDM symbol index of time domain resource allocation pattern of an entry in the UE-specific table is smaller or larger than the OFDM symbol index of the CORESET. More specifically, the offset value is the starting OFDM symbol index of the CORESET. The lengths of time domain resource allocation patterns of entries in the UE-specific table remain the same. For example, as shown in FIG. 10, the offset is added to all entries in the UE-specific table.

If the length of time domain resource allocation pattern plus the offset is larger than the slot length, the OFDM symbols with indexes exceeding the slot boundary appear in the beginning of the next slot. For example, as illustrated in FIG. 10, considering the starting OFDM symbol index of the CORESET is #2, time patterns of the first entry and the second entry are interpreted by the UE via adding the offset. That is the time domain resource allocation pattern of the first entry includes symbol #2 to symbol #13 as well as two OFDM symbols in the beginning of the next slot and the time domain resource allocation pattern of the second entry includes symbol #3 to symbol #13 as well as two OFDM symbols in the beginning of the next slot. In other words, the time domain of the scheduled data is determined by a time domain resource allocation pattern and an offset, wherein the starting OFDM symbol of the scheduled data is equal to the starting OFDM symbol index of time domain resource allocation pattern plus the offset. More specifically, the offset value is equal to the starting OFDM symbol index of the CORESET.

Alternatively, if the length of time domain resource allocation pattern of the entries plus the offset is larger than the slot length, the OFDM symbols with indexes exceeding slot boundary may be ignored by the UE. For example, as illustrated in FIG. 10, considering the starting OFDM symbol index of the CORESET is #2, time patterns of the first entry and the second entry are interpreted by the UE via adding the offset. That is the time domain resource allocation pattern of the first entry spans from symbol #2 to symbol #13 and the time domain resource allocation pattern of the second entry spans from symbol #3 to symbol #13. Length of the time domain resource allocation pattern of the first entry and the second entry interpreted by the UE is reduced. Two last OFDM symbols of the time domain resource allocation pattern of the first entry and the second entry are ignored by the UE. For flexibility, a number of OFDM symbols described above could be further added to the starting OFDM symbol index of the CORESET as the offset.

If the number of binary bits in the DCI indicating the index can represent time domain resource allocation patterns starting from the starting OFDM symbol index of the CORESET, a default table may be used instead of the UE-specific table. For example, considering a CORESET starting at OFDM symbol index #7, number of RIVs starting from OFDM symbol indexes #7 to #13 is 28. If the number of binary bits in the DCI indicating the index pointing to the UE-specific table is 5 bits which can represents 28 time domain resource allocation patterns, a default table different from the UE-specific table is used. More specifically, each entry in the default table represents a time domain resource allocation pattern starting from the starting OFDM symbol index of the CORESET. More specifically, the default table can represent possible time domain resource allocation patterns starting from the starting OFDM symbol index of the CORESET. The time domain of the scheduled data is indicated by the index pointing to an entry in the default table.

In one embodiment, if a field in the DCI indicates the timing between the starting OFDM symbol index of the CORESET and the scheduled data transmission (PUSCH or PDSCH), there is no need for the time domain resource allocation patterns in the UE-specific table to indicate the starting OFDM symbol of the scheduled data transmission. In other words, the scheduled data transmission in each time domain resource allocation pattern starts from the symbol indicated by this field, which may be among a set of values configured by higher layer. For contiguous time domain resource allocation, the time domain resource allocation patterns of entries in the UE-specific table may just provide a time length. For non-contiguous time domain resource allocation, a time domain resource allocation pattern along or combined with a DL resource set (as described above) may indicate which OFDM symbols are allocated to the UE. The UE receives the scheduled data according to the index and the timing indicated in the DCI.

In one embodiment, the UE is configured with at least two UE-specific tables with time domain resource allocation patterns, one of which is for slot based scheduling and one of which is for min-slot based scheduling. More specifically, DCI formats for both slot based scheduling and min-slot based scheduling are different. The UE determines which table to use based on the received DCI format.

Figure 14:
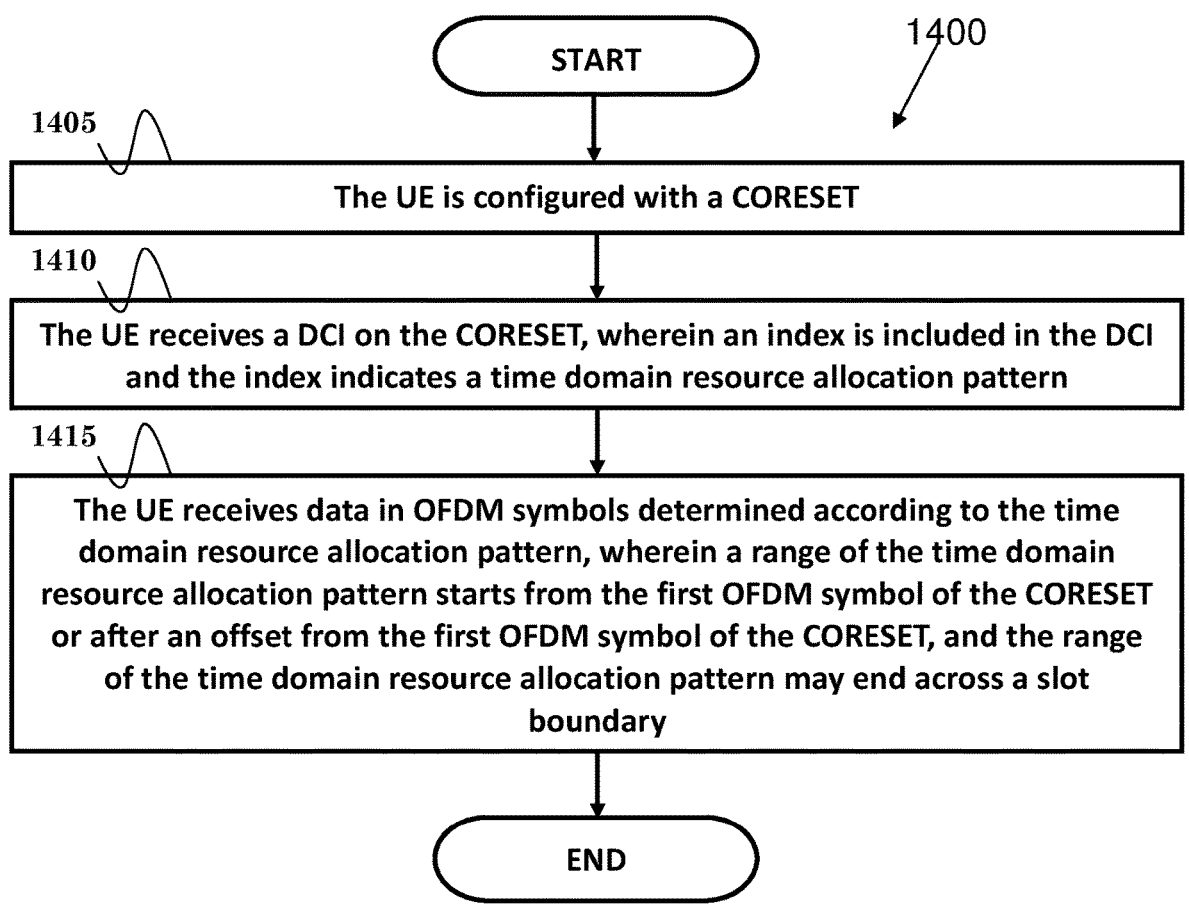
FIG. 14 is a flow chart according to one embodiment.

FIG. 14 is a flow chart 1400 according to one exemplary embodiment from the perspective of a UE. In step 1405, the UE is configured with a CORESET. In step 1410, the UE receives a DCI on the CORESET, wherein an index is included in the DCI and the index indicates a time domain resource allocation pattern. In step 1415, the UE receives data in OFDM symbols determined according to the time domain resource allocation pattern, wherein a range of the time domain resource allocation pattern starts from the first OFDM symbol of the CORESET or after an offset from the first OFDM symbol of the CORESET, and the range of the time domain resource allocation pattern may end across a slot boundary.

Referring back to FIGS. 3 and 4, in one exemplary embodiment of a UE configured with a CORESET, the device 300 includes a program code 312 stored in the memory 310. The CPU 308 could execute program code 312 to enable the UE (i) to receive a DCI on the CORESET, wherein an index is included in the DCI and the index indicates a time domain resource allocation pattern, and (ii) to receive data in OFDM symbols determined according to the time domain resource allocation pattern, wherein a range of the time domain resource allocation pattern starts from the first OFDM symbol of the CORESET or after an offset from the first OFDM symbol of the CORESET, and the range of the time domain resource allocation pattern may end across a slot boundary. Furthermore, the CPU 308 can execute the program code 312 to perform all of the above-described actions and steps or others described herein.

Figure 15:
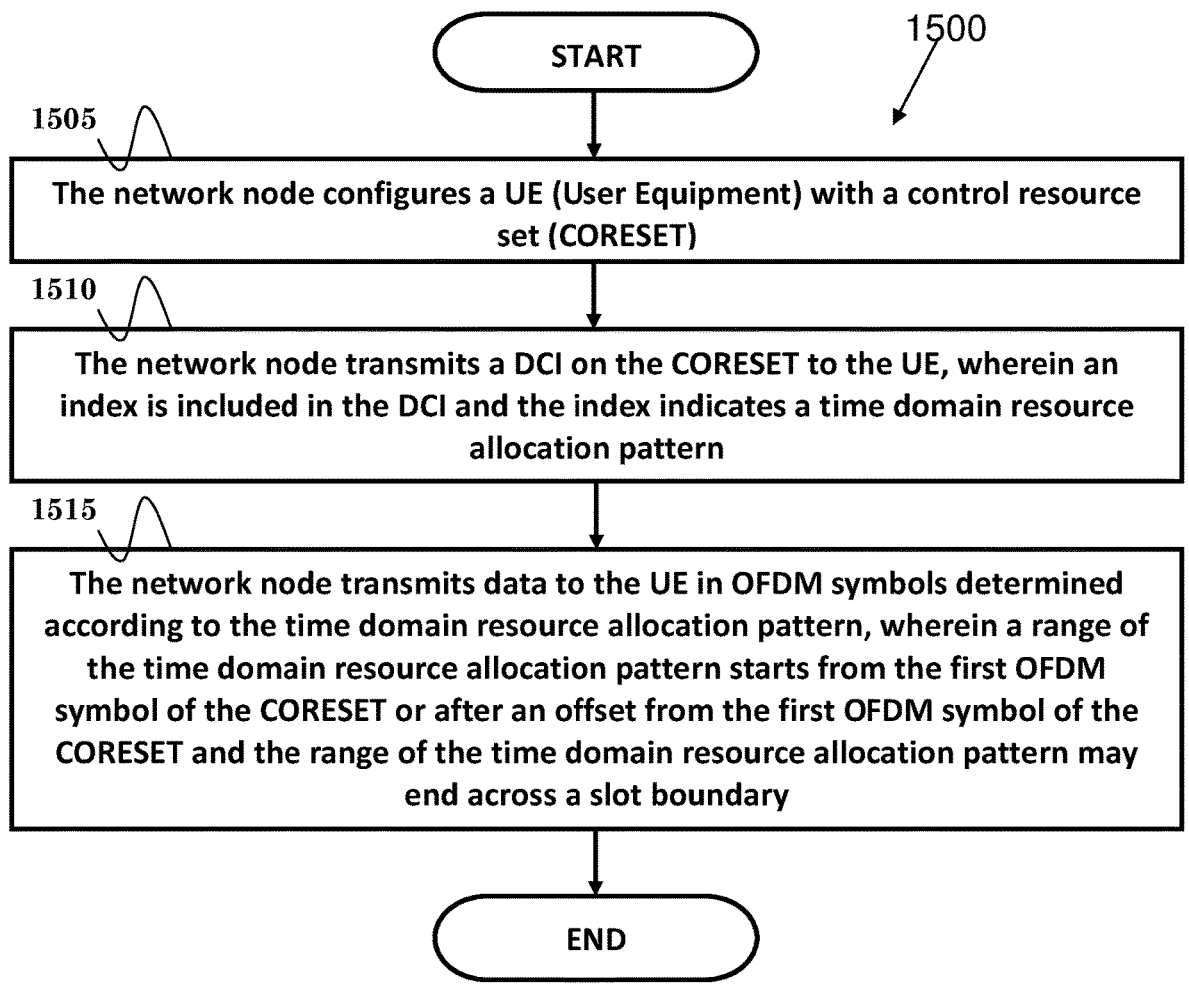
FIG. 15 is a flow chart according to one exemplary embodiment.

FIG. 15 is a flow chart 1500 according to one exemplary embodiment from the perspective of a network node. In step 1505, the network node configures a UE with a control resource set. In step 1510, the network node transmits a DCI on the CORESET to the UE, wherein an index is included in the DCI and the index indicates a time domain resource allocation pattern. In step 1515, the network node transmits data to the UE in OFDM symbols determined according to the time domain resource allocation pattern, wherein a range of the time domain resource allocation pattern starts from the first OFDM symbol of the CORESET or after an offset from the first OFDM symbol of the CORESET and the range of the time domain resource allocation pattern may end across a slot boundary.

Referring back to FIGS. 3 and 4, in one exemplary embodiment of a network node, the device 300 includes a program code 312 stored in the memory 310. The CPU 308 could execute program code 312 to enable the network node (i) to configure a UE with a control resource set, (ii) to transmit a DCI on the CORESET to the UE, wherein an index is included in the DCI and the index indicates a time domain resource allocation pattern, and (iii) to transmit data to the UE in OFDM symbols determined according to the time domain resource allocation pattern, wherein a range of the time domain resource allocation pattern starts from the first OFDM symbol of the CORESET or after an offset from the first OFDM symbol of the CORESET and the range of the time domain resource allocation pattern may end across a slot boundary. Furthermore, the CPU 308 can execute the program code 312 to perform all of the above-described actions and steps or others described herein.

In the context of the embodiments illustrated in FIGS. 14 and 15 and described above, in one embodiment, the offset is a number of OFDM symbol(s), wherein the number could be derived by the UE according to information received from a network node, configured by the network node, or specified in the standards. The index could point to an entry of a UE-specific table which is configured by a network (NW). Each entry of the UE-specific table could comprise a time domain resource allocation pattern.

In one embodiment, the time domain resource allocation in each entry of the UE-specific table could be contiguous. A slot could comprise 14 OFDM symbols. The offset value could be a starting OFDM symbol index of the CORESET.

In one embodiment, if a starting OFDM symbol index of time domain resource allocation pattern of an entry indicated by the index is smaller than the starting OFDM symbol index of the CORESET, the starting OFDM symbol index of time domain resource allocation pattern may add the offset. However, if a starting OFDM symbol index of time domain resource allocation pattern of an entry indicated by the index is larger than or equal to the starting OFDM symbol index of the CORESET, the starting OFDM symbol index of time domain resource allocation pattern may not add the offset.

In one embodiment, the offset value could be added for mapping time domain resource allocation pattern of each entry of the UE-specific table into starting at the starting OFDM symbol index of the CORESET.

Figure 16:
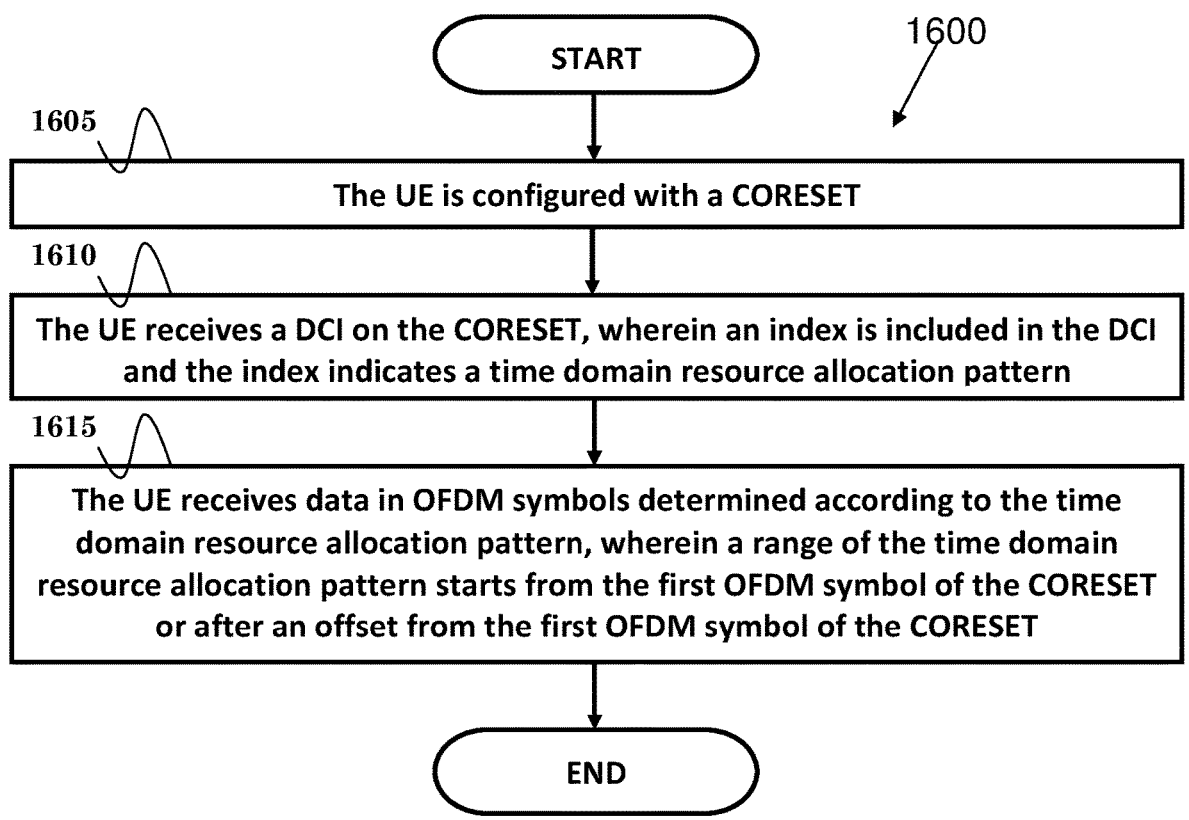
FIG. 16 is a flow chart according to one exemplary embodiment.

FIG. 16 is a flow chart 1600 according to one exemplary embodiment from the perspective of a UE. In step 1605, the UE is configured with a CORESET. In step 1610, the UE receives a DCI on the CORESET, wherein an index is included in the DCI and the index indicates a time domain resource allocation pattern. In step 1615, the UE receives data in OFDM symbols determined according to the time domain resource allocation pattern, wherein a range of the time domain resource allocation pattern starts from the first OFDM symbol of the CORESET or after an offset from the first OFDM symbol of the CORESET.

Referring back to FIGS. 3 and 4, in one exemplary embodiment of a UE that is configured with a CORESET, the device 300 includes a program code 312 stored in the memory 310. The CPU 308 could execute program code 312 to enable the UE (i) to receive a DCI on the CORESET, wherein an index is included in the DCI and the index indicates a time domain resource allocation pattern, and (ii) to receive data in OFDM symbols determined according to the time domain resource allocation pattern, wherein a range of the time domain resource allocation pattern starts from the first OFDM symbol of the CORESET or after an offset from the first OFDM symbol of the CORESET. Furthermore, the CPU 308 can execute the program code 312 to perform all of the above-described actions and steps or others described herein.

Figure 17:
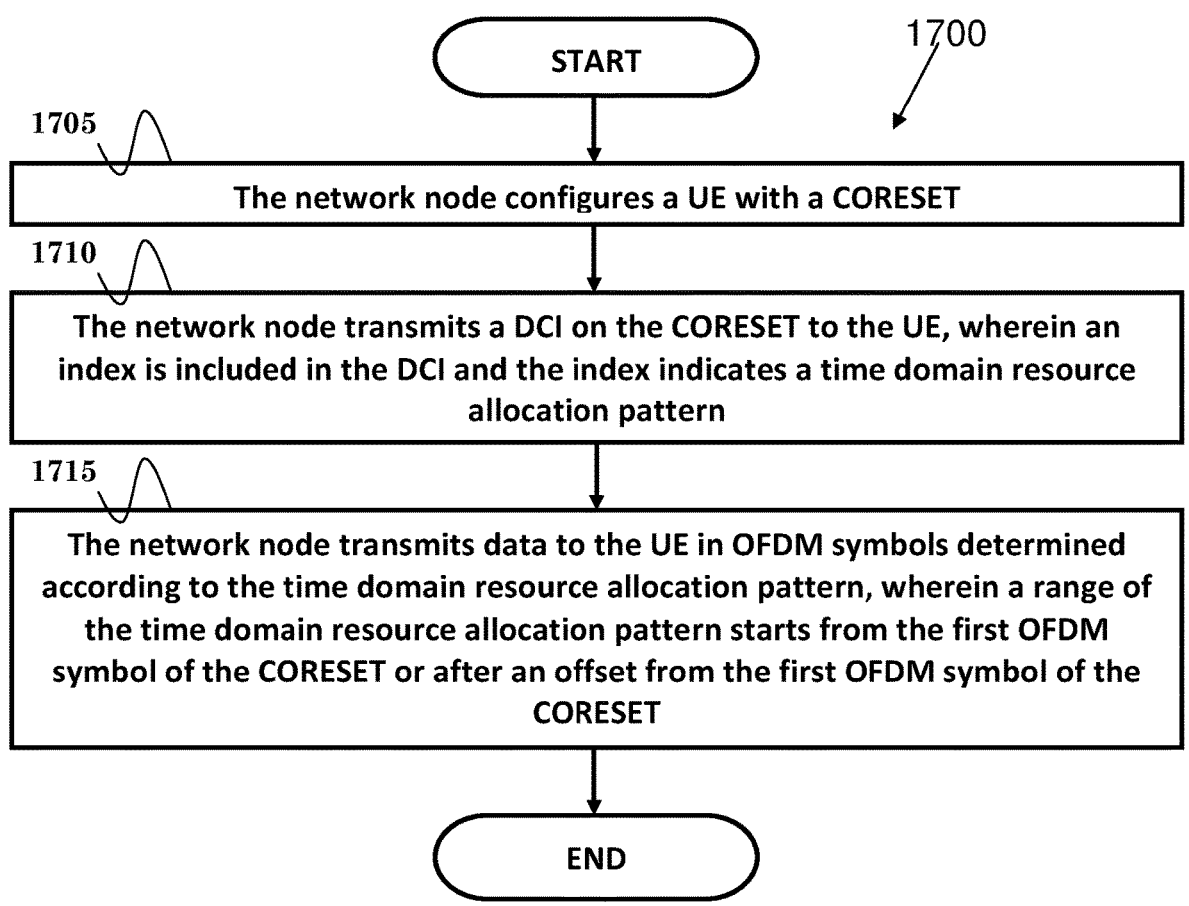
FIG. 17 is a flow chart according to one exemplary embodiment.

FIG. 17 is a flow chart 1700 according to one exemplary embodiment from the perspective of a network node. In step 1705, the network node configures a UE with a CORESET. In step 1710, the network node transmits a DCI on the CORESET to the UE, wherein an index is included in the DCI and the index indicates a time domain resource allocation pattern. In step 1715, the network node transmits data to the UE in OFDM symbols determined according to the time domain resource allocation pattern, wherein a range of the time domain resource allocation pattern starts from the first OFDM symbol of the CORESET or after an offset from the first OFDM symbol of the CORESET.

Referring back to FIGS. 3 and 4, in one exemplary embodiment of a network node, the device 300 includes a program code 312 stored in the memory 310. The CPU 308 could execute program code 312 to enable the network node (i) to configure a UE with a CORESET, (ii) to transmit a DCI on the CORESET to the UE, wherein an index is included in the DCI and the index indicates a time domain resource allocation pattern, and (iii) to transmit data to the UE in OFDM symbols determined according to the time domain resource allocation pattern, wherein a range of the time domain resource allocation pattern starts from the first OFDM symbol of the CORESET or after an offset from the first OFDM symbol of the CORESET. Furthermore, the CPU 308 can execute the program code 312 to perform all of the above-described actions and steps or others described herein.

In the context of the embodiments illustrated in FIGS. 17 and 18 and described above, in one embodiment, the offset could be a number of OFDM symbol(s), wherein the number is derived by the UE according to information received from a network node, configured by the network node, or specified in the standards. The index could point to an entry of a UE-specific table which is configured by a NW. The index with the offset could point to an entry of the UE-specific table. The UE-specific table could include a subset of possible time domain duration of a slot, or possible time domain duration of a slot or multiple slots.

In one embodiment, each entry of the UE-specific table could comprise a time domain resource allocation pattern of a slot or multiple slots. A Resource Indication Value (RIV) could represent a time domain resource allocation pattern. The time domain resource allocation in each entry of the UE-specific table could be contiguous. A slot could comprise 14 OFDM symbols.

In one embodiment, if the CORESET starts at symbol index 0 of a slot, the offset value could be 0. The offset value could be a starting OFDM symbol index of the CORESET.

In one embodiment, if a starting OFDM symbol index of time domain resource allocation pattern of an entry indicated by the index is smaller than the starting OFDM symbol index of the CORESET, the starting OFDM symbol index of time domain resource allocation pattern may add the offset. However, if a starting OFDM symbol index of time domain resource allocation pattern of an entry indicated by the index is larger than or equal to the starting OFDM symbol index of the CORESET, the starting OFDM symbol index of time domain resource allocation pattern may not add the offset.

In one embodiment, the offset value could be a sum of number of RIVs starting from OFDM symbol index(es) smaller than the starting OFDM symbol index of the CORESET. A RIV of time domain resource allocation pattern of the entry indicated by the index could add the offset. A RIV of the time domain resource allocation pattern could be subjected to a modulo operation with a number (in other words mod a number and add the offset), wherein the number is number of sum of RIVs representing time domain resource allocation from starting OFDM symbol index of the CORESET to last OFDM symbol index of slot with different contiguous duration.

In one embodiment, the offset value could be added for the mapping RIV of each entry of the UE-specific table into RIV which represents a time domain resource allocation pattern starting at the starting OFDM symbol index of the CORESET. Alternatively the offset value could be added for the mapping time domain resource allocation pattern of each entry of the UE-specific table into starting at the starting OFDM symbol index of the CORESET.

In one embodiment, if a starting OFDM symbol index of time domain resource allocation pattern of the entry indicated by the index is smaller than the starting OFDM symbol index of the CORESET, a RIV of the time domain resource allocation pattern be subjected to a modulo operation with a number (in other words mod a number and add the offset), wherein the number is number of sum of RIVs representing time domain resource allocation from starting OFDM symbol index of the CORESET to last OFDM symbol index of slot with different contiguous duration. Alternatively, if a starting OFDM symbol index of the entry indicated by the index is larger than or equal to the starting OFDM symbol index of the CORESET, a RIV of the time domain resource allocation pattern mod a number and add the offset, wherein the number is number of sum of RIVs representing time domain resource allocation from starting OFDM symbol index of the CORESET to last OFDM symbol index of slot with different contiguous duration.

In one embodiment, a binary field in the DCI could indicate the index, wherein the size of the binary field represents a subset of the UE-specific table. If the size of the binary field in the DCI for the index can represent all RIVs from starting OFDM symbol index of the CORESET to slot boundary, the offset could be zero. However, if the size of the binary field in the DCI for the index can represent all RIV from starting OFDM symbol index of the CORESET to last OFDM symbol index of slot, the index could point to an entry of a default table, where each entry indicate a time domain resource allocation pattern starting at starting OFDM symbol index of the CORESET. The default table could be different from the UE-specific table.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE (User Equipment), comprising:
   the UE is configured with a control resource set (CORESET);
   the UE is configured with a first UE-specific table with time domain resource allocation patterns for slot based scheduling and a second UE-specific table with time domain resource allocation patterns for mini-slot based scheduling;
   the UE receives a Downlink Control Information (DCI) on the CORESET in a middle of a slot, wherein the DCI indicates an index pointing to an entry for a time domain resource allocation pattern;
   the UE selects, based on DCI format of the DCI, which UE-specific table between the first UE-specific table and the second UE-specific table is associated with the entry;
   the UE derives, based on the selected UE-specific table, whether to add an offset to the time domain resource allocation pattern; and
   the UE receives data in Orthogonal Frequency Division Multiplexing (OFDM) symbols according to the time domain resource allocation pattern of the entry in the determined UE-specific table and optionally the offset.

2. The method of claim 1, wherein if the first UE-specific table is selected, the UE does not add the offset to the time domain resource allocation pattern.

3. The method of claim 1, wherein if the second UE-specific table is selected, the UE adds the offset to the time domain resource allocation pattern such that a range of the time domain resource allocation pattern in the second specific table starts from a first OFDM symbol of the CORESET or after a first OFDM symbol of the CORESET.

4. The method of claim 3, wherein the first OFDM symbol of the CORESET is not among a first three symbols in the slot.

5. The method of claim 3, wherein a starting symbol and an ending symbol of the time domain resource allocation pattern after adding the offset are in two different slots.

6. The method of claim 1, wherein the offset is a symbol index of the first OFDM symbol of the CORESET.

7. A User Equipment (UE) wherein the UE is configured with a control resource set (CORESET) and a first UE-specific table with time domain resource allocation patterns for slot based scheduling and a second UE-specific table with time domain resource allocation patterns for mini-slot based scheduling, the UE comprising:
   a control circuit;
   a processor installed in the control circuit; and
   a memory installed in the control circuit and operatively coupled to the processor;
   wherein the processor is configured to execute a program code stored in the memory to:
      receive a Downlink Control Information (DCI) on the CORESET in a middle of a slot, wherein the DCI indicates an index pointing to an entry for a time domain resource allocation pattern;
      select, based on DCI format of the DCI, which UE-specific table between the first UE-specific table and the second UE-specific table is associated with the entry;
      derive, based on the selected UE-specific table, whether to add an offset to the time domain resource allocation pattern; and
      receive data in Orthogonal Frequency Division Multiplexing (OFDM) symbols according to the time domain resource allocation pattern of the entry in the determined UE-specific table and optionally the offset.

8. The UE of claim 7, wherein if the first UE-specific table is selected, the UE does not add the offset to the time domain resource allocation pattern.

9. The UE of claim 7, wherein if the second UE-specific table is selected, the UE adds the offset to the time domain resource allocation pattern such that a range of the time domain resource allocation pattern in the second specific table starts from a first OFDM symbol of the CORESET or after a first OFDM symbol of the CORESET.

10. The UE of claim 9, wherein the first OFDM symbol of the CORESET is not among a first three symbols in the slot.

11. The UE of claim 9, wherein a starting symbol and an ending symbol of the time domain resource allocation pattern after adding the offset are in two different slots.

12. The UE of claim 7, wherein the offset is a symbol index of the first OFDM symbol of the CORESET.

* * * * *